(12) United States Patent
Wimmer

(10) Patent No.: US 11,385,427 B2
(45) Date of Patent: Jul. 12, 2022

(54) HERMAPHRODITIC HYBRID OPTICAL CABLES AND CONNECTORS

(71) Applicant: Corning Research & Development Corporation, Corning, NY (US)

(72) Inventor: Michael Wimmer, Berlin (DE)

(73) Assignee: Corning Research & Development Corporation, Corning, NY (US)

(*) Notice: Subject to any disclaimer, the term of this patent is extended or adjusted under 35 U.S.C. 154(b) by 0 days.

(21) Appl. No.: 17/037,987

(22) Filed: Sep. 30, 2020

(65) Prior Publication Data

US 2021/0011235 A1 Jan. 14, 2021

Related U.S. Application Data

(63) Continuation of application No. PCT/US2019/024864, filed on Mar. 29, 2019.

(Continued)

(51) Int. Cl.
*G02B 6/38* (2006.01)
*G02B 6/42* (2006.01)
(Continued)

(52) U.S. Cl.
CPC ........... *G02B 6/4293* (2013.01); *G02B 6/383* (2013.01); *G02B 6/3817* (2013.01);
(Continued)

(58) Field of Classification Search
CPC .... G02B 6/3817; G02B 6/3825; G02B 6/383; G02B 6/3831; G02B 6/3893; G02B 6/3895; G02B 6/4293; H01R 13/28; H01R 24/84
See application file for complete search history.

(56) References Cited

U.S. PATENT DOCUMENTS 2,434,226 A 1/1948 Reynolds
3,725,844 A 4/1973 McKeown et al.
(Continued)

FOREIGN PATENT DOCUMENTS

CN 102195192 A 9/2011
DE 1164532 B 3/1964
(Continued)

OTHER PUBLICATIONS

"Fiber Systems. Com, ""Optron Hybrid—Fiber Optic/Electric Connectors"", Available Online at <https://web.archive.org/web/20200701210727/http://www.fibersystems.com/products/optron-hybrid-ds/>, Retrieved on Jul. 1, 2020, 5 pages."
(Continued)

*Primary Examiner* — Ryan A Lepisto
(74) *Attorney, Agent, or Firm* — Michael E. Carroll, Jr.

(57) ABSTRACT

Hybrid optical cables, hybrid optical connectors, and hybrid optical adapters are disclosed. In one embodiment, a hybrid optical connector includes a connector housing having an insertion portion, wherein the insertion portion is asymmetric with respect to a mid-plane of the connector housing that is positioned in an optical axis of the hybrid optical connector. The hybrid optical connector further includes a ferrule disposed within the connector housing, and a first hermaphroditic electrical contact and a second hermaphroditic electrical contact disposed within the connector housing adjacent opposing sides of the ferrule.

32 Claims, 15 Drawing Sheets

Related U.S. Application Data

(60) Provisional application No. 62/652,166, filed on Apr. 3, 2018.

(51) Int. Cl.
*H01R 24/84* (2011.01)
*H01R 13/28* (2006.01)

(52) U.S. Cl.
CPC ......... *G02B 6/3831* (2013.01); *G02B 6/3895* (2013.01); *H01R 24/84* (2013.01); *G02B 6/3825* (2013.01); *G02B 6/3893* (2013.01); *H01R 13/28* (2013.01)

(56) References Cited

U.S. PATENT DOCUMENTS

| | | | | |
|---|---|---|---|---|
| 4,445,750 | A * | 5/1984 | Grois | G02B 6/3887 385/69 |
| 5,336,116 | A * | 8/1994 | Boteler | H01R 13/436 439/332 |
| 7,572,063 | B2 * | 8/2009 | Mynott | G02B 6/3817 385/56 |
| 8,727,637 | B2 * | 5/2014 | Isenhour | G02B 6/424 385/78 |
| 8,834,037 | B2 * | 9/2014 | Wouters | G02B 6/383 385/71 |
| 2014/0205240 | A1 | 7/2014 | Scadden et al. | |
| 2017/0160488 | A1 | 6/2017 | Smith et al. | |
| 2017/0184798 | A1 | 6/2017 | Coenegracht | |
| 2018/0052293 | A1 * | 2/2018 | Mullaney | G02B 6/4416 |

FOREIGN PATENT DOCUMENTS

| | | |
|---|---|---|
| EP | 2423721 A1 | 2/2012 |
| JP | 2013-257432 A | 12/2013 |
| TW | 201643491 A | 12/2016 |
| WO | 2015/120365 A1 | 8/2015 |
| WO | 2016/063135 A2 | 4/2016 |
| WO | 2016/087452 A1 | 6/2016 |

OTHER PUBLICATIONS

Birns, "Standard Hybrid Connectors", Available Online at <https://web.archive.org/web/20110204060026/http://www.birns.com/new-birns-millenium-standard-connector-available.html>, Feb. 4, 2011, 2 pages.

Corning, "TFOCA GenX Hybrid 2x2 Fiber Optic—Copper Connector", Available Online at <https://www.strantech.com/products/tfoca-genx-hybrid-2x2-fiber-optic-copper-connector/>, 2020, 4 pages.

CRE Underwater Connectivity, "Hybrid Connectors / (electrical and co-axial/fibre optic)", Available Online at <https://web.archive.org/web/20171108090420/http://www.cre-marine.com/hybrid_connectors.html>, Retrieved on Nov. 8, 2017, 4 pages.

Encitech, "Welcome to Encitech", Available Online at <https://web.archive.org/web/20180116014758/http://www.encitech.com/start.aspx>, retrieved on Jan. 16, 2018, 2 pages.

Fisher Bybrid, "Hybrid Connectors", Available Online at <https://web.archive.org/web/20141127131025/http://www.componentelectronics.com/Docs/FischerHybrid.pdf>, Retrived on Nov. 27, 2014, Edition 2, 24 pages.

Gurreri, Mike, "Development trends in optical connectivity", 2016 Optical Fiber Communications Conference and Exhibition (OFC), Mar. 2016.

International Search Report and Written Opinion of the International Searching Authority; PCT/US2019/024864; dated Jul. 9, 2019; 15 Pages; European Patent Office.

Lemo Connectors, "Hybrid Electrical—Fibre Other Series", Available Online at <https://web.archive.org/web/20140806133053/http://www.lemo.com/en/hybrid-electrical-fibre/3k-93c-0>, Aug. 6, 2014, 1 page.

Molex, "MediSpec Product Family", Available Online at <https://web.archive.org/web/20171212021036/http://www.molex.com/molex/products/group?key=medispec_product_family&channel=products>, Retrieved on Dec. 12, 2017, 4 pages.

Neutrik, "opticalCON Duo Hybrid", Available Online at <https://web.archive.org/web/20170303173835/http://www.neutrik.com/en/data/opticalcon/opticalcon-duo-cable/opticalcon-duo-hybrid>, Retrieved on Mar. 3, 2017, 2 pages.

QPC, "E-Link Hybrid Connector", Available Online at <https://web.archive.org/web/20150220200142/http://www.qpcfiber.com/produc/connectors/e-link-hybrid-connector/>, Retrieved on Feb. 20, 2015, 5 pages.

Rosenberger, "Fiber Optic Solutions", Available Online at <https://web.archive.org/web/20180303154702/http://www.rosenberger.com/en/products/medical/fiber_optic.php>, Retrived on Mar. 3, 2018, 2 pages.

Seacon, "Optical Hybrid Dry-Mate", Available Online at <https://web.archive.org/web/20200228062751/http://seaconworldwide.com/products/optical-hybrid-dry-mate/optical-hybrid-dry-mate/>, Retrieved on Feb. 28, 2020, 3 pages.

Senko, "Introducing the new IP-ONE Hybrid Commector, Combing Power and Fiber in ONE,", Available Online at <https://web.archive.org/web/20190426060306/http://www.senko.com/ip-one/>, Apr. 26, 2014, 3 pages.

Teledyne Marine, "Nautilus Rolling Seal Hybrid Connector", Available Online at <http://www.teledynemarine.com/nautilus-rolling-seal-hybrid-nrh-connector?ProductLineID=55>, retreieved in 2021, 3 pages.

Tyco Eelectronics Corp., "The DatasheetArchive—Datatsheet Search Engine", Available Online at <https://www.tme.eu/Document/d868f2507332979be982f1c566f4878c/1445957-2.pdf>, 2020, 1 page.

Winchester Electronic, "VN Modular Hybrid Connector Series", Availabe Online at <https://www.winchesterelectronics.com/wp-content/uploads/2015/12/VN-Modular-Hybrid-Connectors.pdf>, 2015, 12 pages.

* cited by examiner

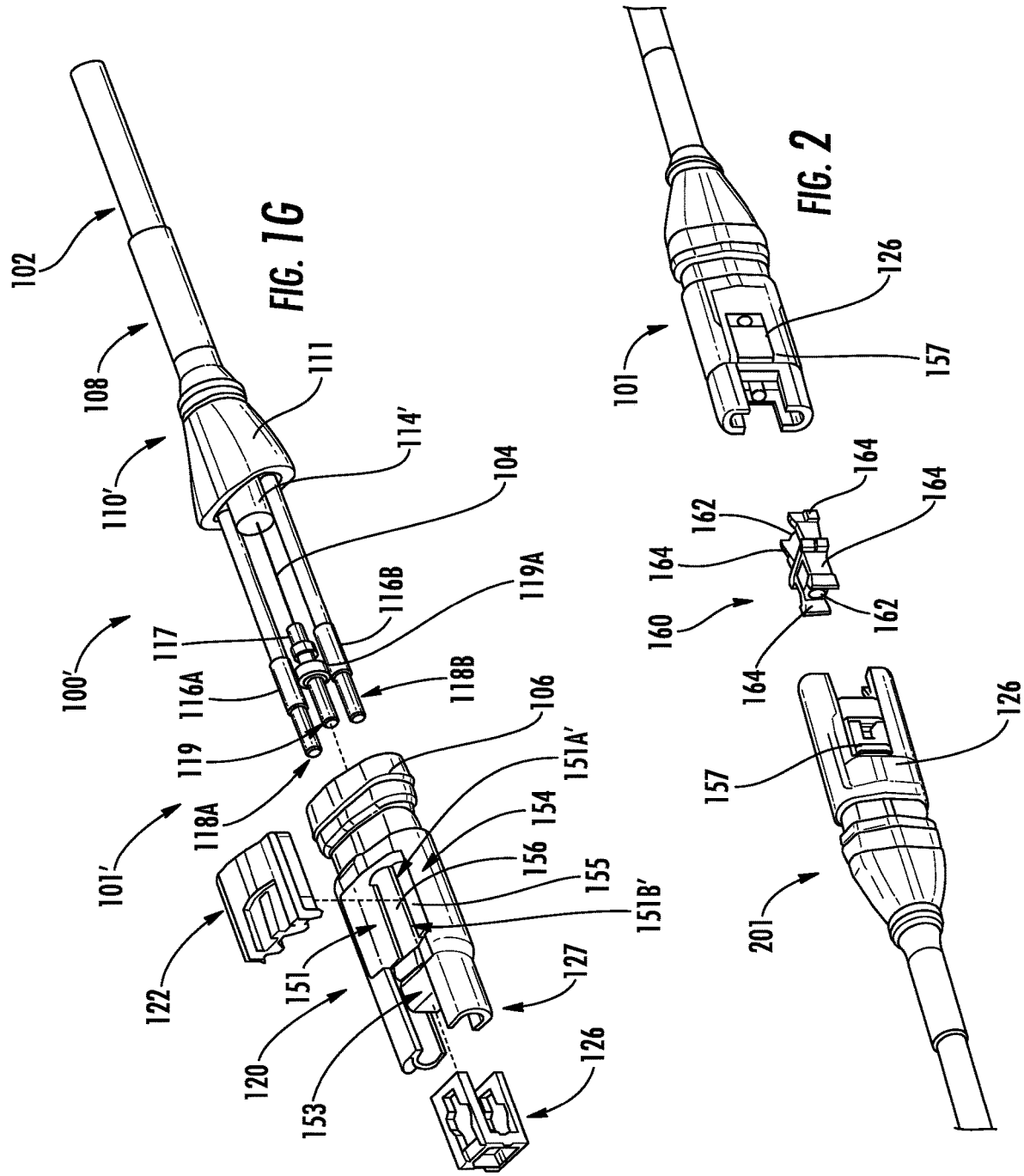

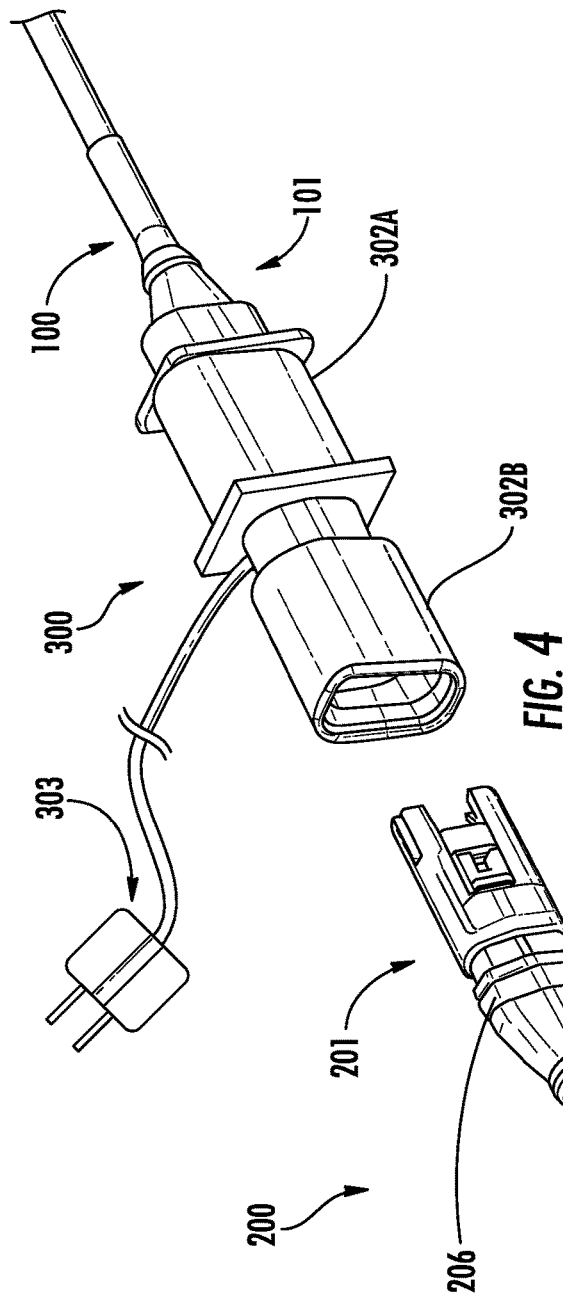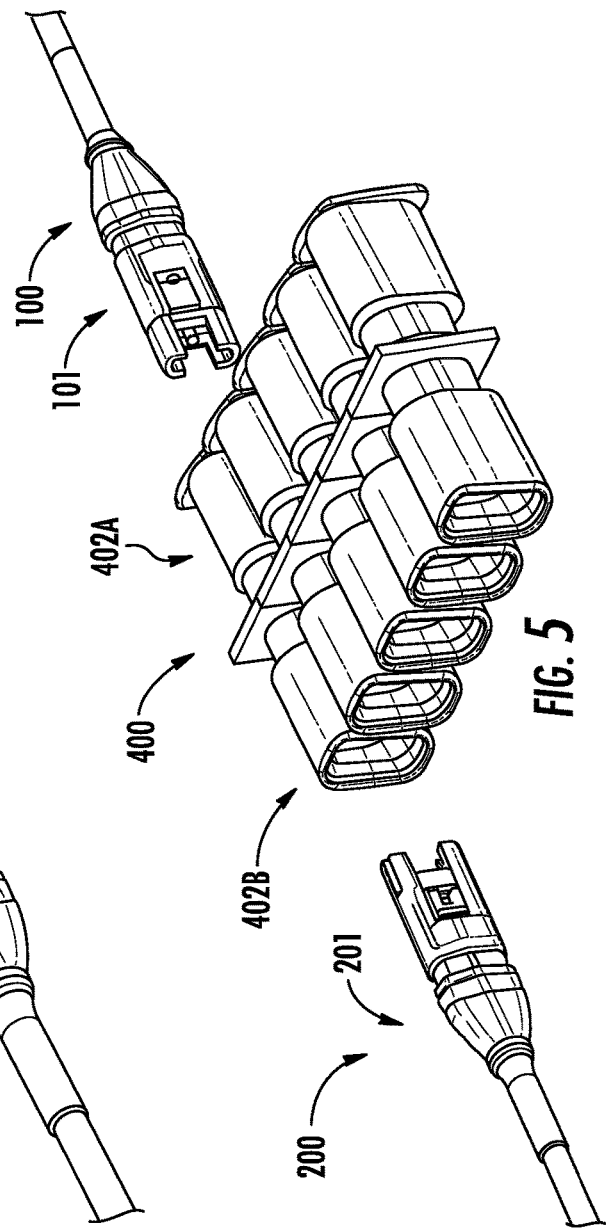
FIG. 4
FIG. 5

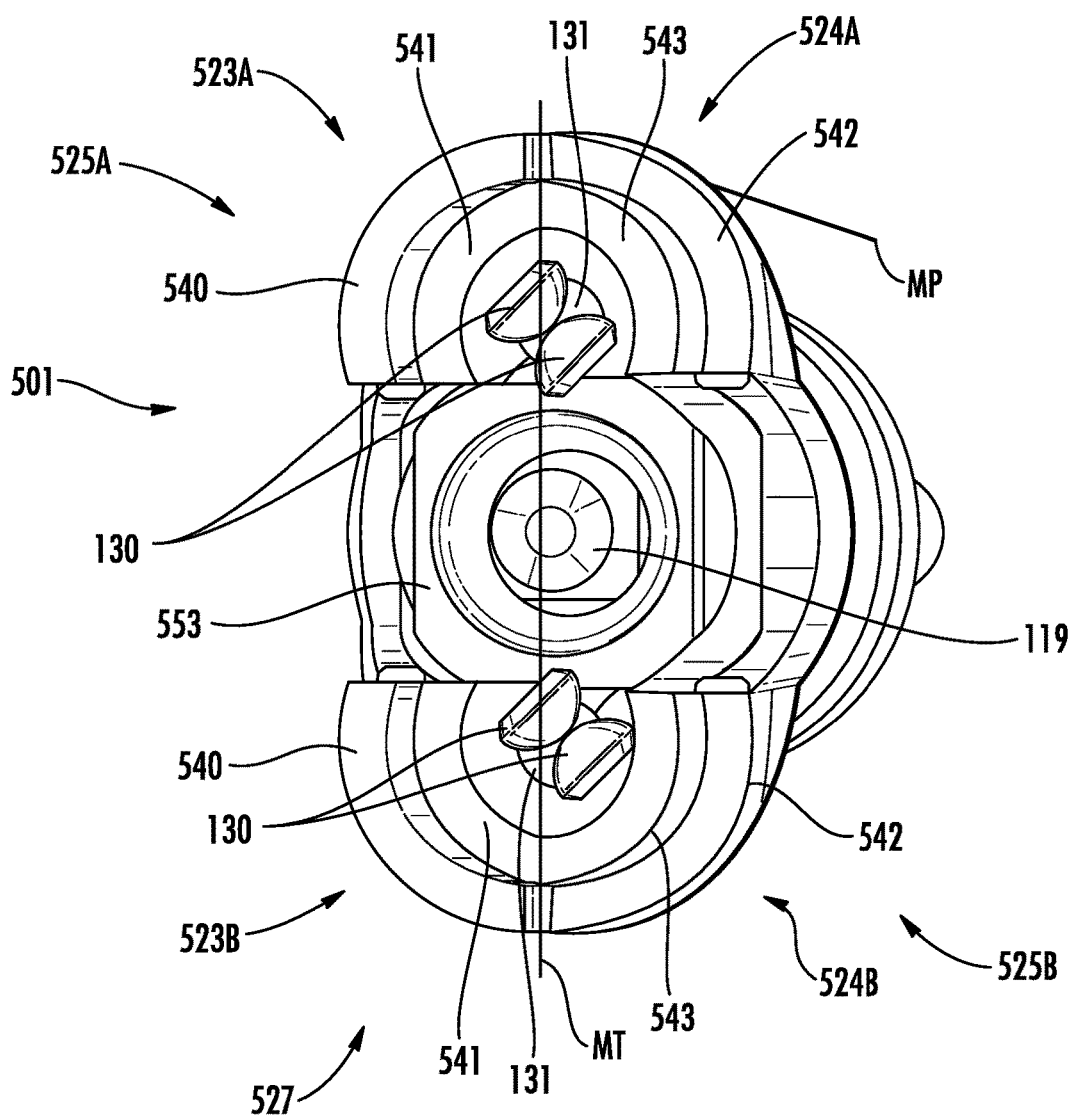
FIG. 9
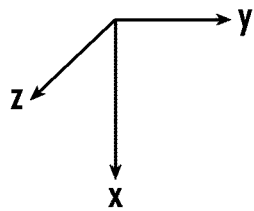

HERMAPHRODITIC HYBRID OPTICAL CABLES AND CONNECTORS

RELATED APPLICATIONS

This application is a continuation of International Application No. PCT/US2019/024864 filed Mar. 29, 2019, which claims the benefit of priority to U.S. Provisional Application No. 62/652,166 filed on Apr. 3, 2018, the content of each of which is relied upon and incorporated herein by reference in its entirety.

BACKGROUND

The present disclosure generally relates to optical cables and, more particularly, hermaphroditic hybrid optical cables and connectors.

Benefits of optical fiber include extremely wide bandwidth and low noise operation. Because of these advantages, optical fiber is increasingly being used for a variety of applications, including, but not limited to, broadband voice, video, and data transmission. Outdoor fiber networks are popular to support the demand of data consumption. Due to high speed wireless communication networks and the Internet of Things, many communication devices and antennas need to be equipped with a fiber optic connection for communicating data into the optical fiber infrastructure required of such communication networks.

Devices of the communications network may also need to be powered by electrical cables. Hybrid optical cables are optical cables including one or more optical fibers for communicating optical data as well as electrical conductors for providing electrical power. Hybrid optical cables reduce the number of cables that are required to power and enable optical communication between devices. In some outdoor applications, electrical devices may be located at great distances from one another. One example is a large stadium, where electronic devices such as computer servers, radios, antennas, and the like are distributed throughout the stadium. Long runs of electrical conductors cause high electrical losses due to increased electrical resistance.

Electrical loss may be reduced over long runs of electrical conductors by increasing the voltage provided over the electrical conductors. As an example, digital electricity is a technology that sends electrical power over digital packets at high voltages (e.g., 400 V-DE, where V-DE stands for voltage digital electricity). Other high-voltage protocols are possible. However, increasing the voltage of the transmitted power requires more stringent clearance and creepage requirements. Thus, uninsulated electrical conductors must be positioned at greater distances between one another.

SUMMARY

In one embodiment, a hybrid optical connector includes a connector housing having an insertion portion, wherein the insertion portion is asymmetric with respect to a mid-plane of the connector housing that is positioned within an optical axis of the hybrid optical connector. The hybrid optical connector further includes a ferrule disposed within the connector housing, and a first hermaphroditic electrical contact and a second hermaphroditic electrical contact disposed within the connector housing adjacent opposing sides of the ferrule.

In another embodiment, a hybrid optical cable includes a cable assembly and a hybrid optical connector. The cable assembly includes an optical fiber, a first electrical conductor and a second electrical conductor. The hybrid optical connector includes a connector housing having an insertion portion, wherein the insertion portion is asymmetric with respect to a mid-plane of the connector housing that is positioned in an optical axis of the hybrid optical connector. The hybrid optical connector further includes a ferrule disposed within the connector housing, wherein the optical fiber is disposed within the ferrule, a first hermaphroditic electrical contact, and a second hermaphroditic electrical contact. The first and second hermaphroditic electrical contacts are disposed within the connector housing adjacent opposing sides of the ferrule. The first electrical conductor is electrically coupled to the first hermaphroditic electrical contact and the second electrical conductor is electrically coupled to the second hermaphroditic electrical contact.

In yet another embodiment, a hybrid optical connector includes a connector housing having an insertion portion, wherein the insertion portion is asymmetric with respect to a mid-plane of the connector housing that is positioned in an optical axis of the hybrid optical connector. The hybrid optical connector further includes a ferrule disposed within the connector housing, and a male electrical contact and a female electrical contact disposed within the connector housing adjacent opposing sides of the ferrule, wherein the female electrical contact defines a bore.

In yet another embodiment, a hybrid optical connector adapter assembly includes an adapter housing and an adapter disposed within the adapter housing. The adapter housing includes a first opening operable to receive a first connector type and a second opening operable to receive a second connector type, wherein the first connector type and the second connector type are different. The adapter housing further includes an insertion portion proximate the second connector type, the insertion portion having a first portion and a second portion that define a first electrical contact receiving portion and a second electrical contact receiving portion, respectively, wherein the insertion portion is asymmetric with respect to a mid-plane of the adapter housing that is positioned in a longitudinal axis of the adapter housing. The adapter includes an inner portion configured to receive a first ferrule and a second ferrule.

BRIEF DESCRIPTION OF THE DRAWINGS

FIG. 1G schematically depicts a cutaway and partially exploded perspective view another hybrid optical connector according to one or more embodiments and illustrated herein;

FIG. 2 schematically depicts a first hybrid optical connector, a second hybrid optical connector and an adapter in an unmated state according to one or more embodiments and illustrated herein;

FIG. 4 schematically depicts a first hybrid optical connector coupled to a hardened adapter and a second hybrid optical connector according to one or more embodiments and illustrated herein;

FIG. 5 schematically depicts a first hybrid optical connector, a second hybrid optical connector, and a ganged hardened adapter according to one or more embodiments and illustrated herein;

FIG. 9 schematically depicts a front view of another hybrid optical connector according to one or more embodiments and illustrated herein;

DETAILED DESCRIPTION

Embodiments described herein are directed to hybrid optical connectors and cable assemblies providing both optical and electrical connections. More particularly, the hybrid optical connectors and cables enable optical communication over optical fiber as well as provide electrical power to powered devices over two electrical conductors. The hybrid optical connectors have two hermaphroditic electrical contacts that are minimally spaced to satisfy clearance and creepage requirements for high voltages, such as voltages up to 400 V-DE. Therefore, the minimally spaced contacts allow for a small sized hybrid optical connector. As used herein, V-DE refers to volts of digital electricity sent in packets. An example protocol of digital electricity is that specified by Voltserver Inc. of East Greenwich, R.I. V-DE may be employed in long runs of electrical conductors to reduce electrical losses due to electrical resistance of the electrical conductors. It should be understood that embodiments are not limited to V-DE electrical power transmission. However, increased voltage presents electrical conductor spacing requirements due clearance and creepage. The hybrid optical connectors described herein satisfy clearance and creepage requirements set forth by Safety Extra Low Voltage (SELV) standards. "Clearance" is the shortest distance in air between two uninsulated electrical conductors. "Creepage" is the shortest distance along an insulating material between two uninsulated electrical conductors.

As described in more detail below, the hybrid optical connectors described herein are hermaphroditic meaning that the connector may mate with itself. A male contact to male contact coupling reduces the variation on cable assemblies for more efficient storage and management for users. The hybrid optical connectors described herein are configured to mate with Standard Connectors (SC) in either UPC or APC configurations. The asymmetric configuration of the insertion face of the hybrid optical connectors provides keying to ensure that the hybrid optical connector is mated to a mated connector in the proper orientation. The insertion face of the hybrid optical connectors also provides insulation to the hermaphroditic electrical contacts, thereby preventing inadvertent touching of the contacts. Additionally, the housing of the hybrid optical connectors provides easy access to the ferrule tip for cleaning away debris.

Various embodiments of hybrid electrical connectors, optical cable assemblies, and hybrid optical adapters are described in detail herein.

Figure 1A:
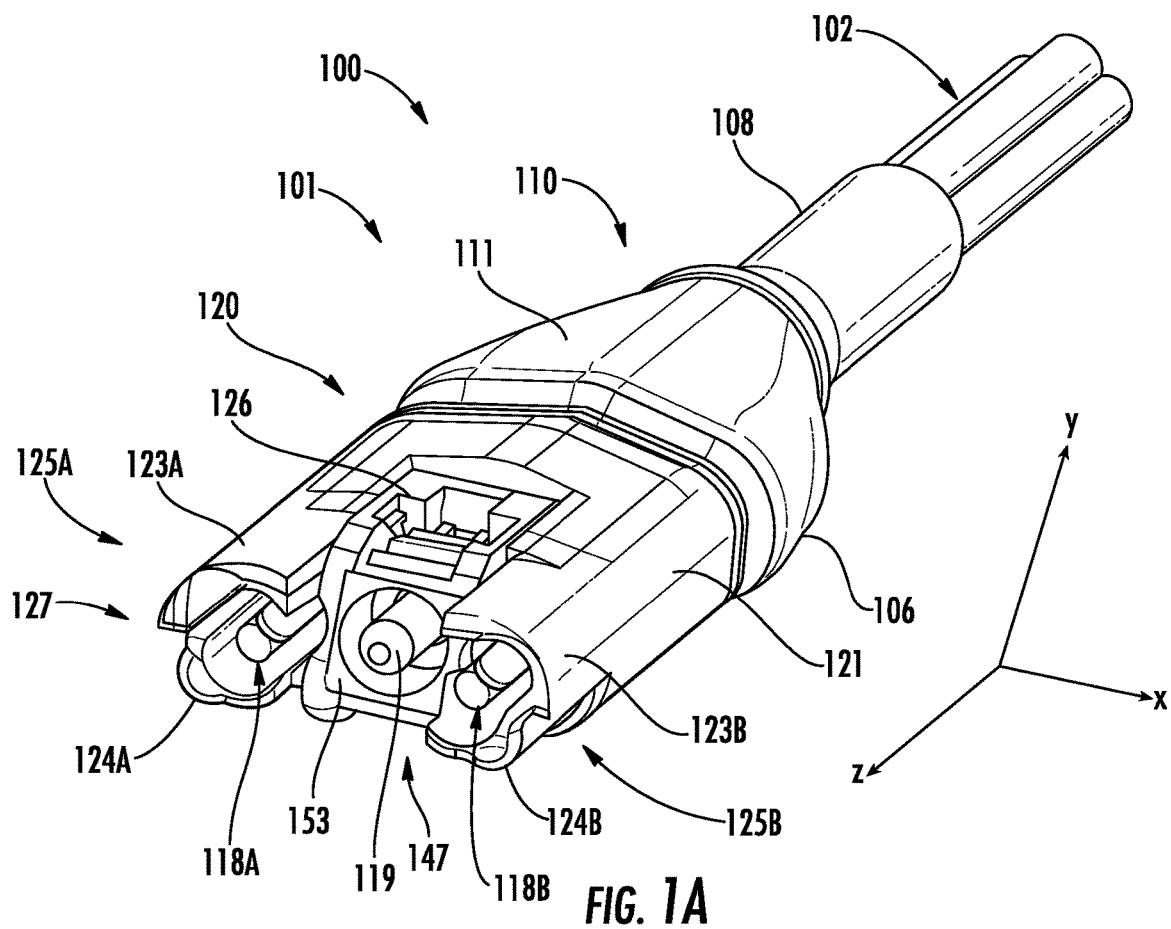
FIG. 1A schematically depicts a perspective view of an example hybrid optical connector of an example hybrid optical cable according to one or more embodiments described and illustrated herein.
Figure 1B:
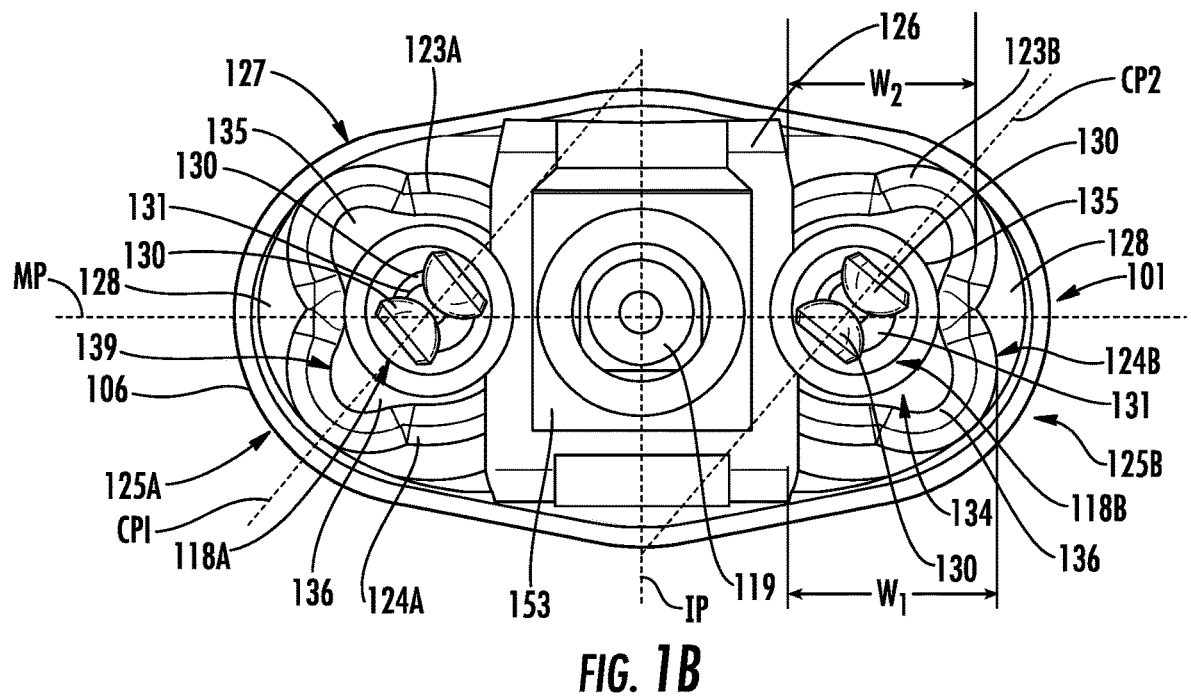
FIG. 1B schematically depicts a front elevation view of the example hybrid optical connector of FIG. 1A according to one or more embodiments and illustrated herein.
Figure 1C:
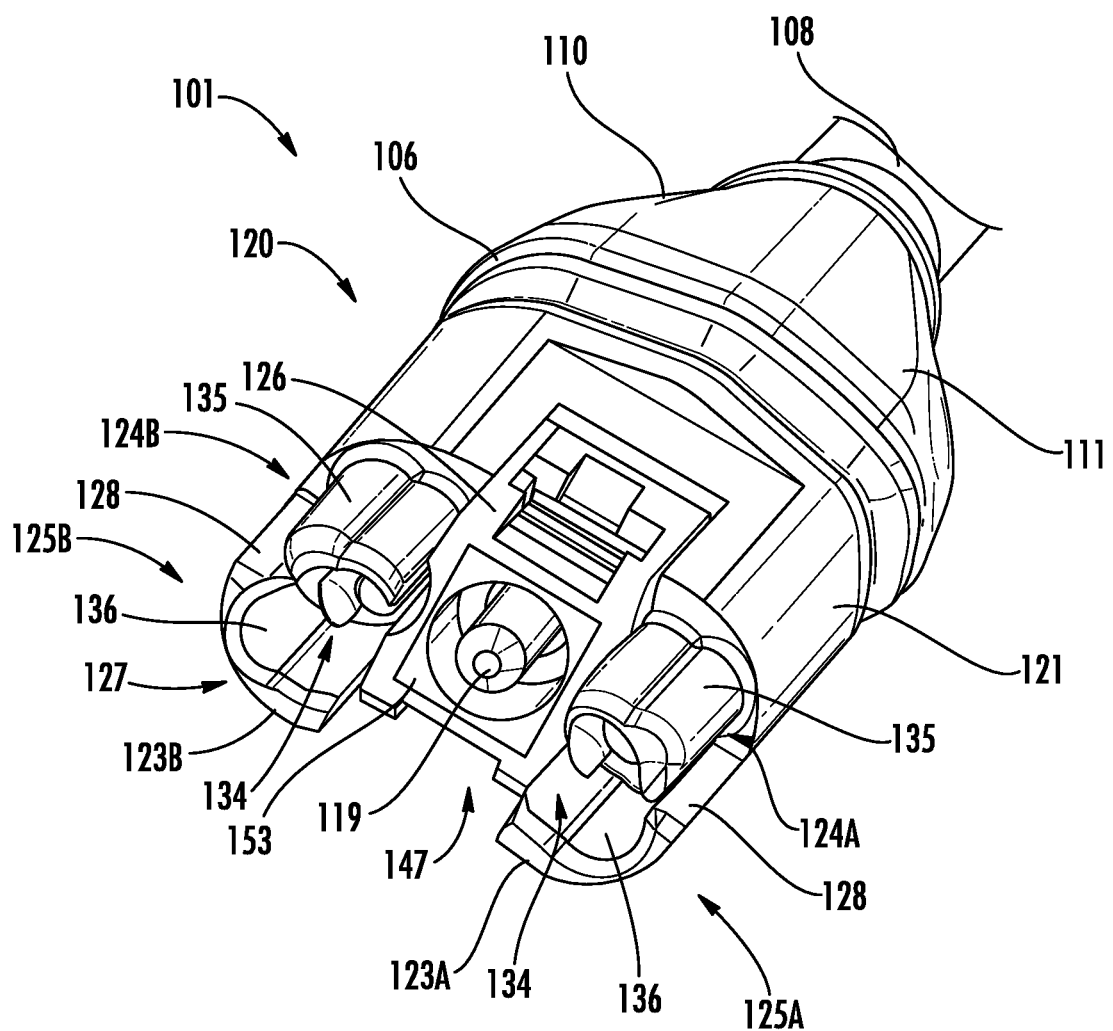
FIG. 1C schematically depicts another perspective view of the example hybrid optical connector of FIG. 1A according to one or more embodiments and illustrated herein.
Figure 1D:
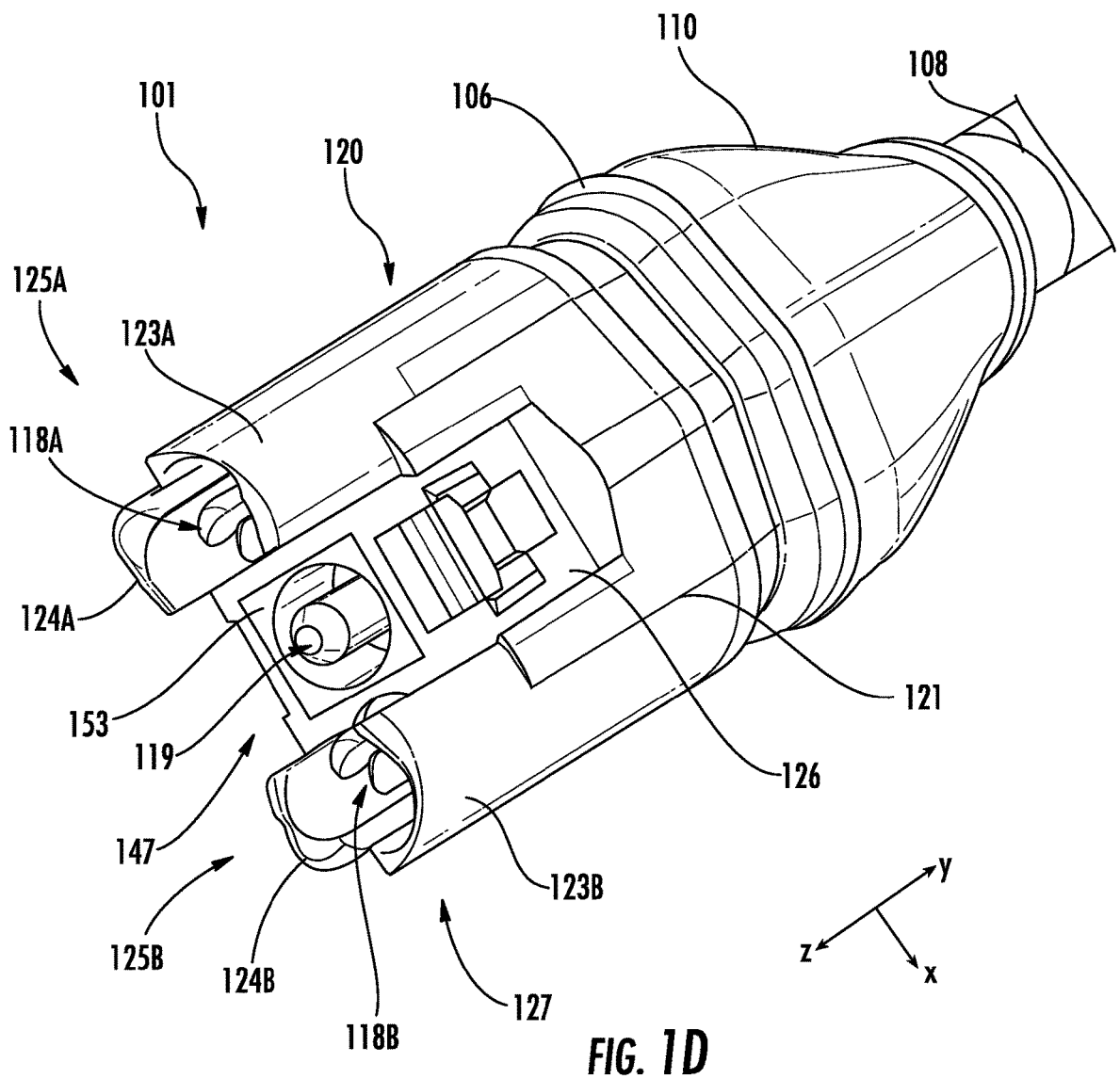
FIG. 1D schematically depicts another perspective view of the example hybrid optical connector of FIG. 1A according to one or more embodiments and illustrated herein.
Figure 1E:
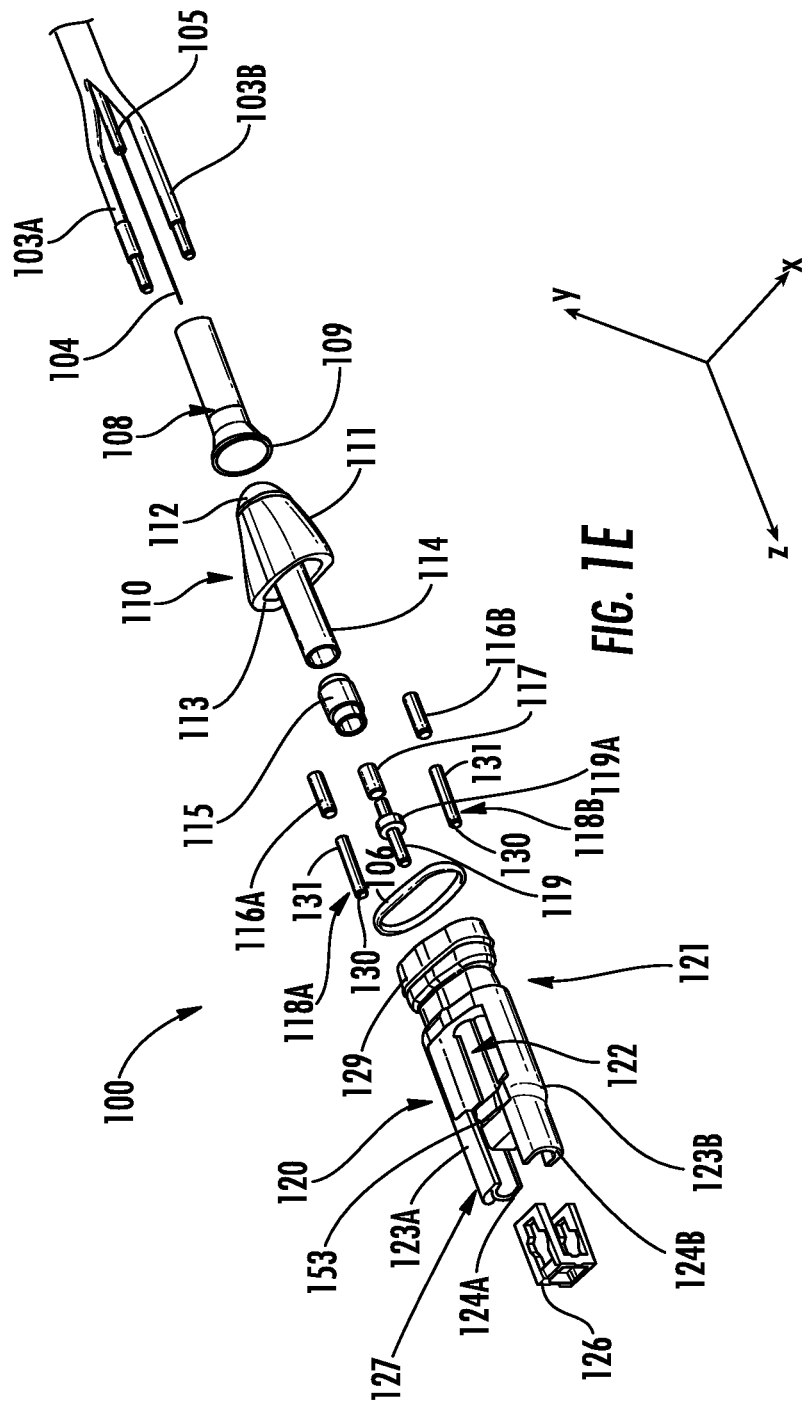
FIG. 1E schematically depicts an exploded perspective view of the example hybrid optical connector FIG. 1A according to one or more embodiments and illustrated herein.
Figure 1F:
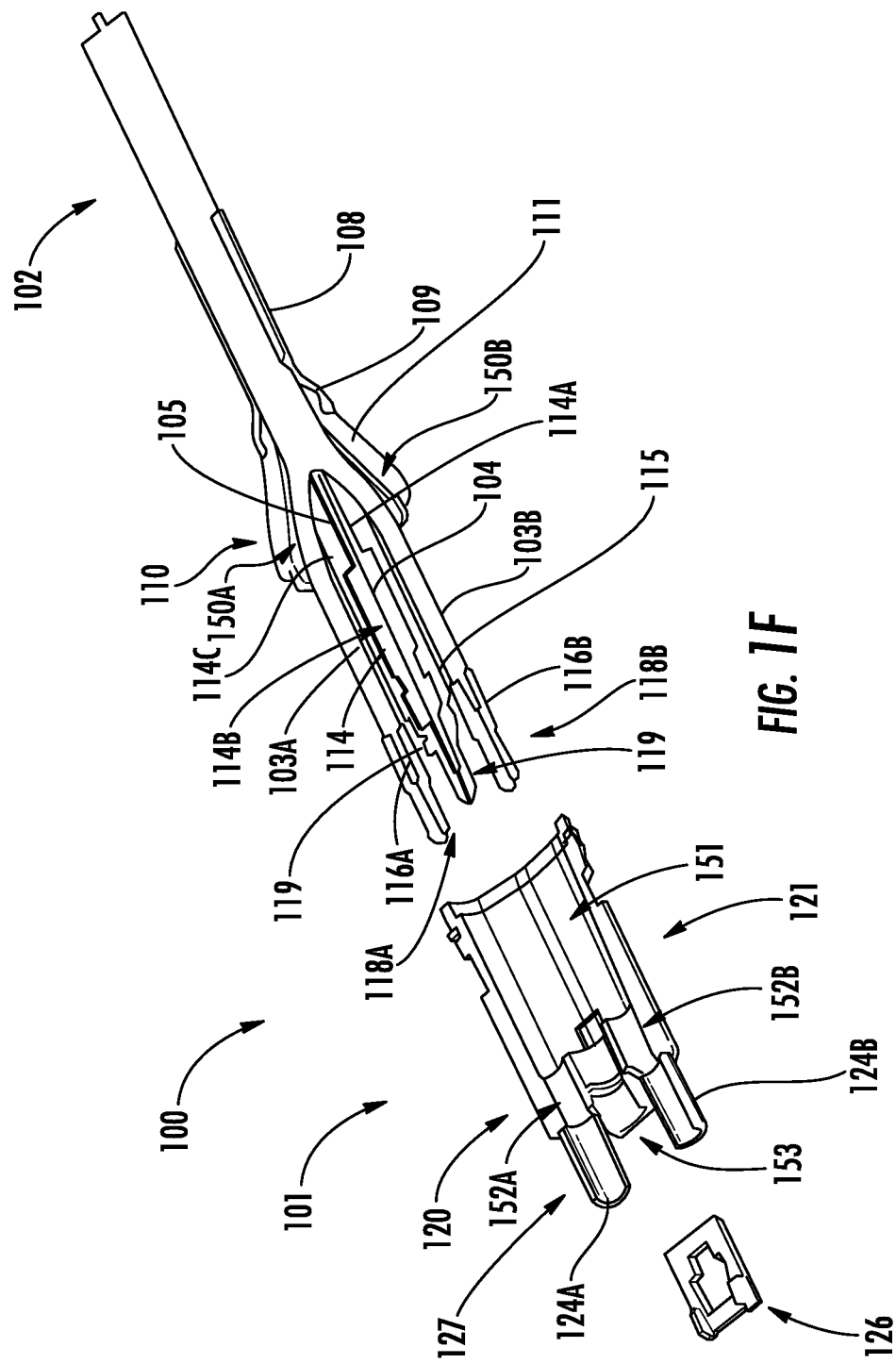
FIG. 1F schematically depicts a cutaway and partially exploded perspective view of the hybrid optical connector of FIG. 1A according to one or more embodiments and illustrated herein.

FIGS. 1A-1F schematically depict an example hybrid optical cable assembly 100 comprising a hybrid optical connector 101. FIG. 1A depicts a front perspective view of the hybrid optical connector 101 of the hybrid optical cable assembly 100. FIG. 1B is a front elevation view, FIG. 1C is a top isometric view, and FIG. 1D is a bottom isometric view of the hybrid optical connector 101. FIG. 1E is an exploded view of the hybrid optical cable assembly 100, including a hybrid optical connector 101. FIG. 1F is a cutaway, partial exploded view of the hybrid optical cable assembly 100.

Referring generally to FIGS. 1A-1F, the example hybrid optical cable assembly 100 generally comprises a hybrid optical cable 102 coupled to a hybrid optical connector 101. Referring particularly to FIG. 1F, the hybrid optical cable 102 may include a first electrical conductor 103A, a second electrical conductor 103B, one or more optical fibers 104, and one or more strength members 105. As an example and not a limitation, the first electrical conductor 103A and the second electrical conductor 103B may be copper wire having an end stripped away from any jacket or insulation.

The one or more strength members 105 provide additional strength to the hybrid optical cable 102 and may be formed from resin bonded e-glass (e.g., type of GRP), resin bonded aramid, solid steel, stranded steel, or other materials. The first electrical conductor 103A, the second electrical conductor 103B, the optical fiber 104, and the one or more strength members 105 may be disposed within one or more layers (not shown), such as an outer jacket, for example.

The example hybrid optical connector 101 generally comprises a boot 108, a rear plug body 110, and a connector housing 120. Referring particularly to FIGS. 1E and 1F, the hybrid optical cable 102 is positioned through the boot 108, which, in some embodiments, may be configured as a heat shrink boot that conforms to the shape of the hybrid optical cable 102 with the application of heat. The boot 108 may provide added strength and strain relief to the hybrid optical cable 102 at the hybrid optical connector 101.

The boot 108 is coupled to the rear plug body 110 of the example hybrid optical connector. In the illustrated embodiment, boot engagement features 109 mate with corresponding rear plug engagement features 112 to secure the boot 108 to the rear plug body 110. As an example and not a limitation, the boot engagement features 109 and the rear plug engagement features 112 may be configured as mating threads such that the boot 108 is screwed onto the rear plug body 110.

The example rear plug body 110 includes a main body 111 and a fiber body 114 extending from the main body 111. Referring particularly to FIG. 1G, the main body 111 receives the first electrical conductor 103A, the second electrical conductor 103B, the one or more strength members 105, and the optical fiber 104. A routing feature 114C within the main body 111 routes the first electrical conductor 103A and the second electrical conductor such that they exit the rear plug body 110 outboard of the fiber body 114. The routing feature 114C further includes a cavity 114A that receives the one or more strength members 105 and the optical fibers 104. The one or more strength members 105 may be terminated within the cavity 114A or other features of the rear plug body 110 by any method such that they are secured to the rear plug body 110 (e.g., crimping, adhesive, or other methods). The optical fiber 104 passes through a bore within the routing feature 114C and enters the fiber body 114.

The ferrule 119 may be disposed within a ferrule holder 119A. The ferrule holder 119A mates with a spring support 115 such that a portion of the ferrule holder 119A is inserted into the spring support 115. The ferrule holder 119A may mate with the spring support 115 by any method, such as, without limitation, by an interference fit. In the illustrated embodiment, a spring 117 is also disposed within the spring support 115. The spring 117 engages the ferrule holder 119A such that the spring 117 biases the ferrule 119 forward (i.e., in the positive z-direction), and allows the ferrule 119 to translate backwards (i.e., in the negative z-direction) when the hybrid optical connector 101 is mated with a mated connector.

The hybrid optical connector 101 further comprises a first hermaphroditic electrical contact 118A and a second hermaphroditic electrical contact 118B that are electrically coupled to the first electrical conductor 103A and the second electrical conductor 103B, respectively. Referring to FIGS. 1B, 1E, and 1F, each of the first hermaphroditic electrical contact 118A and the second hermaphroditic electrical contact 118B includes first and second compliant members 130 that extend from a conductor coupling portion 131. The first electrical conductor 103A and the second electrical conductor 103B are coupled to the conductor coupling portion 131 of the first hermaphroditic electrical contact 118A and the second hermaphroditic electrical contact 118B, respectively. As an example and not a limitation, the first electrical conductor 103A and the second electrical conductor 103B may be coupled to the conductor coupling portion 131 by crimping, soldering, or by any other method.

The conductor coupling portion 131 of the first hermaphroditic electrical contact 118A and the second hermaphroditic electrical contact 118B may then be disposed within a first insulation member 116A and a second insulation member 116B to provide electrical insulation of the first hermaphroditic electrical contact 118A and the second hermaphroditic electrical contact 118B within the connector housing 120. The first and second insulation members 116A, 116B and are disposed within first and second conductor recesses 152A, 152B of the connector housing 120, respectively (FIG. 1G). In some embodiments, the first and second insulation members 116A, 116B include keying features (not shown) to prevent the first hermaphroditic electrical contact 118A and the second hermaphroditic electrical contact 118B from rotating or otherwise moving within the connector housing 120.

As best shown in FIGS. 1B, 1E, and 1F, the compliant members 130 of the first hermaphroditic electrical contact 118A and the second hermaphroditic electrical contact 118B are adjacent to one another. As described in more detail below, the compliant members are operable to be deflected away from one another when mated with mated hermaphroditic electrical contacts of a mated connector.

In the illustrated embodiment, the compliant members have a "D-shape" in cross section such that a round portion of one compliant member 130 faces a round portion of the other compliant member 130. Referring to FIG. 1B, a first contact plane CP1 is orthogonal to a flat portion of the compliant members 130 of the first hermaphroditic electrical contact 118A, and a second contact plane CP2 is orthogonal to a flat portion of the compliant members 130 of the second hermaphroditic electrical contact 118B. The first contact plane CP1 and the second contact plane CP2 may be parallel to one another as shown in FIG. 1B. The compliant members 130 are such that the first contact plane CP1 and the second contact plane CP2 are transverse to an insertion plane IP that is orthogonal to the mid-plane MP and is positioned in the optical axis of the hybrid optical connector. The mid-plane MP passes through the first and second hermaphroditic electrical contacts 118A, 118B and the optical axis of the hybrid optical connector 101 defined by the ferrule 119. The arrangement of the compliant members 130 of the first hermaphroditic electrical contact 118A and the second hermaphroditic electrical contact 118B allow for hermaphroditic coupling of the hybrid optical connector 101, as described in more detail below.

Once again referring generally to FIGS. 1A-1F, the rear plug body 110 is coupled to the connector housing 120. For example, the rear plug body 110 may include a lip portion 113 that is inserted into an enclosure 151 of the connector housing 120 (FIGS. 1E and 1F). The lip portion 113 may be coupled to the connector housing 120 by an interference fit, by a suitable adhesive, by laser welding, by ultrasonic welding, or by any other suitable method. It should be understood that other mechanical features may be provided to be coupled the rear plug body 110 to the connector housing (e.g., latching arms).

In the illustrated embodiment, an O-ring 106 is disposed within a circumferential groove 129 of the connector housing 120. The O-ring 106 seals an adapter when the hybrid optical connector 101 is inserted into an adapter, as described in more detail below.

Still referring to FIGS. 1A-1F, the example connector housing 120 generally comprises a body portion 121, an insertion portion 127, and a ferrule housing 153. The connector housing 120 defines an enclosure 151 (see FIG. 4) that receives the first electrical conductor 103A, the second electrical conductor 103B and the optical fiber 104. The connector housing 120 may be fabricated using a material suitable for optical communications applications. As non-limiting examples, the connector housing 120 may be fabricated from polyether ether ketone or polyetherimide. In some embodiments, the connector housing 120 is a monolithic component formed by a molding process. In other embodiments, the connector housing 120 comprises separate components. For example, the ferrule housing 153 may be an integral component of the connector housing 120, or the ferrule housing 153 may be a separate component that engages the body portion 121 of the connector housing 120.

The ferrule housing 153 may be configured to mate with a standard optical connector. In the non-limiting example depicted by FIGS. 1A-1F, the ferrule housing 153 has a Standard Connector (SC) optical connector shape such that the ferrule housing 153 is operable to mate with SC-type connectors and adapters, as described in more detail below. In the illustrated embodiment, a slider cap 126 is disposed on the ferrule housing 153. The slider cap 126 is provided to releasably engage with mating features of a mated optical connector and/or adapter. The ferrule housing 153 further defines an enclosure in which the ferrule 119 and the ferrule holder 119A are disposed. The ferrule 119 includes one or more bores to receive one or more optical fibers 104. In the illustrated embodiment, the ferrule 119 has a single bore that receives a single optical fiber. As an example and not a limitation, the front facet of the ferrule 119 may have an angled polish (e.g., an angled physical contact (APC) connector) or no angled polish (e.g., an ultra-physical contact (UPC) connector).

Referring particularly to FIGS. 1A and 1B, the body portion 121 transitions to an insertion portion 127 that is operable to mate with a mated optical connector or an adapter. The insertion portion 127 of the connector housing 120 is asymmetric with respect to a mid-plane MP that ensures only unidirectional mating to allow reverse electrical current protection, and also provide insulation for the first and second hermaphroditic electrical contacts 118A, 118B disposed therein.

Referring to FIGS. 1A-1D, the example insertion portion 127 comprises a first portion 125A and a second portion 125B. The ferrule housing 153 and the ferrule 119 are disposed within an opening 147 between the first portion 125A and the second portion 125B. The first hermaphroditic electrical contact 118A is disposed within the first portion 125A of the insertion portion 127 and the second hermaphroditic electrical contact 118B is disposed within the second portion 125B of the insertion portion 127. The first and second portions 125A, 125B extend beyond a tip of the first and second hermaphroditic electrical contacts 118A, 118B, respectively. Thus, the first and second portions 125A, 125B may prevent undesirable contact between an object (e.g., the fingers of a person) and the first and second hermaphroditic electrical contacts 118A, 118B.

The ferrule housing 153 is located between the first hermaphroditic electrical contact 118A and the second hermaphroditic electrical contact 118B. A distance between the first hermaphroditic electrical contact 118A and the second hermaphroditic electrical contact 118B should satisfy clearance and creepage requirements according to the voltage of the desired application and the material of the connector housing 120. As an example and not a limitation, the clearance requirement for electrical conductors at 336 V-DE is between 3 mm and 4 mm, including endpoints, depending on pollution degree of the air. The creepage requirements is between 4 mm and 8 mm, including endpoints, depending on the material chosen. As an example and not a limitation the connector housing 120 may be made for polyetherimide, which has a creepage distance of 6.3 mm at 336 V-DE. As an example and not a limitation, the center distance between the first hermaphroditic electrical contact 118A and the second hermaphroditic electrical contact 118B is 10 mm or greater, which allows for a creepage path along the ferrule housing 153 of more than 8 mm.

Referring to FIGS. 1B and 1C, the insertion portion 127 is asymmetric about the mid-plane MP of the connector housing 120 to ensure that the hybrid optical connector 101 mates with a mated connector or adapter in only one mating orientation. This asymmetry provides keying to allow only one insertion orientation upon mating between hybrid optical connectors, and thus to maintain positive and negative connection requirements.

Particularly, the first portion 125A comprises a first half 123A and a second half 124A. Similarly, the second portion 125B also comprises a first half 123B and a second half 124B. Each of the first halves 123A, 123B have an overall width $w_1$ that is greater than an overall width $w_2$ of the second halves 124A, 124B. The second halves 124A, 124B provide a male coupling feature and the first halves 123A, 123B define a female coupling feature. The first halves 123A, 123B define an opening 134 operable to receive the second halves 124A, 124B of a mated hybrid optical connector. In the illustrated embodiment, the second halves 124A, 124B have a lobe feature 135 having a semi-circle shape in cross section. The openings 134 defined by the first halves 123A, 123B have a scalloped wall 136 operable to receive the lobe feature 135 of the second halves 124A, 124B. Additionally, the first halves 123A, 123B define an outer ledge 128. When mated with a mated hybrid optical connector, the ledges of the first halves 123A, 123B interface with the ledges of the mated hybrid optical connector when the second halves 124A, 124B are inserted into the openings defined by first halves of the mated hybrid optical connector.

FIGS. 1E and 1F illustrate an embodiment wherein the ferrule 119 and the ferrule holder 119A are maintained by the fiber body 114. As described above, the ferrule holder 119A is inserted into the fiber body 114. During fabrication, the connector housing 120 is slid over the prepared cable end provided by the ferrule 119, the ferrule holder 119A, the first and second hermaphroditic electrical contacts 118A, 118B, and the rear plug body 110. The interface between the rear plug body 110 and the connector housing 120 may be sealed by adhesive, laser welding, ultrasonic welding, or any other method.

In the example hybrid optical cable 100' depicted by FIG. 1G, the ferrule 119 and the ferrule holder 119A are maintained and secured by the connector housing 120' of the hybrid optical connector 101'. In the example embodiment of FIG. 1G, the fiber body 114' of the rear plug body 110' is shorter than the fiber body 114 depicted by FIGS. 1E and 1F and does not have an opening to receive the ferrule holder 119A. Rather, the enclosure 151' of the connector housing 120 is configured to securely receive and maintain the ferrule 119 and the ferrule holder 119A. Particularly, the enclosure 151' has a ferrule section 151B' and a fiber body section 151A' separated by a spring wall 155. When assembled, the ferrule 119 is disposed within the ferrule section 151B' and the ferrule housing 153. The ferrule holder 119A and spring 117 are disposed within the ferrule section 151B' such that the spring 117 contacts the spring wall 155. The example spring support 115 further includes a notch 156 operable to allow the optical fiber 104 to pass over the spring support 115. The fiber body 114' is disposed within the fiber body section 151A' of the enclosure 151'

The connector housing 120 includes an opening 154 to provide access to the enclosure 151' for installing the ferrule 119, the ferrule holder 119A and the spring 117 therein. After assembly, a cover 122 may be disposed over the opening 154 to seal the enclosure 151' from the environment. The cover 122 may be adhered, welded or otherwise secured to the connector housing 120.

FIG. 2 schematically illustrates an example first hybrid optical connector 101 and an example second hybrid optical connector 201 in a pre-mated state. The example first hybrid optical connector 101 and the example second hybrid optical connector 201 are mated utilizing an adapter 160. The adapter 160 includes an inner portion 162 (i.e., an opening), a ferrule sleeve (not shown in FIG. 2) within the opening, and four arms 164. The inner portion 162 and ferrule sleeve are operable to receive ferrules of the first hybrid optical connector 101 and the second hybrid optical connector 201. The arms 164 are operable to engage latching features of 157 of the ferrule housing 153 of the first hybrid optical connector 101 and the second hybrid optical connector 201 to maintain the two connectors in a mated relationship.

Figure 3A:
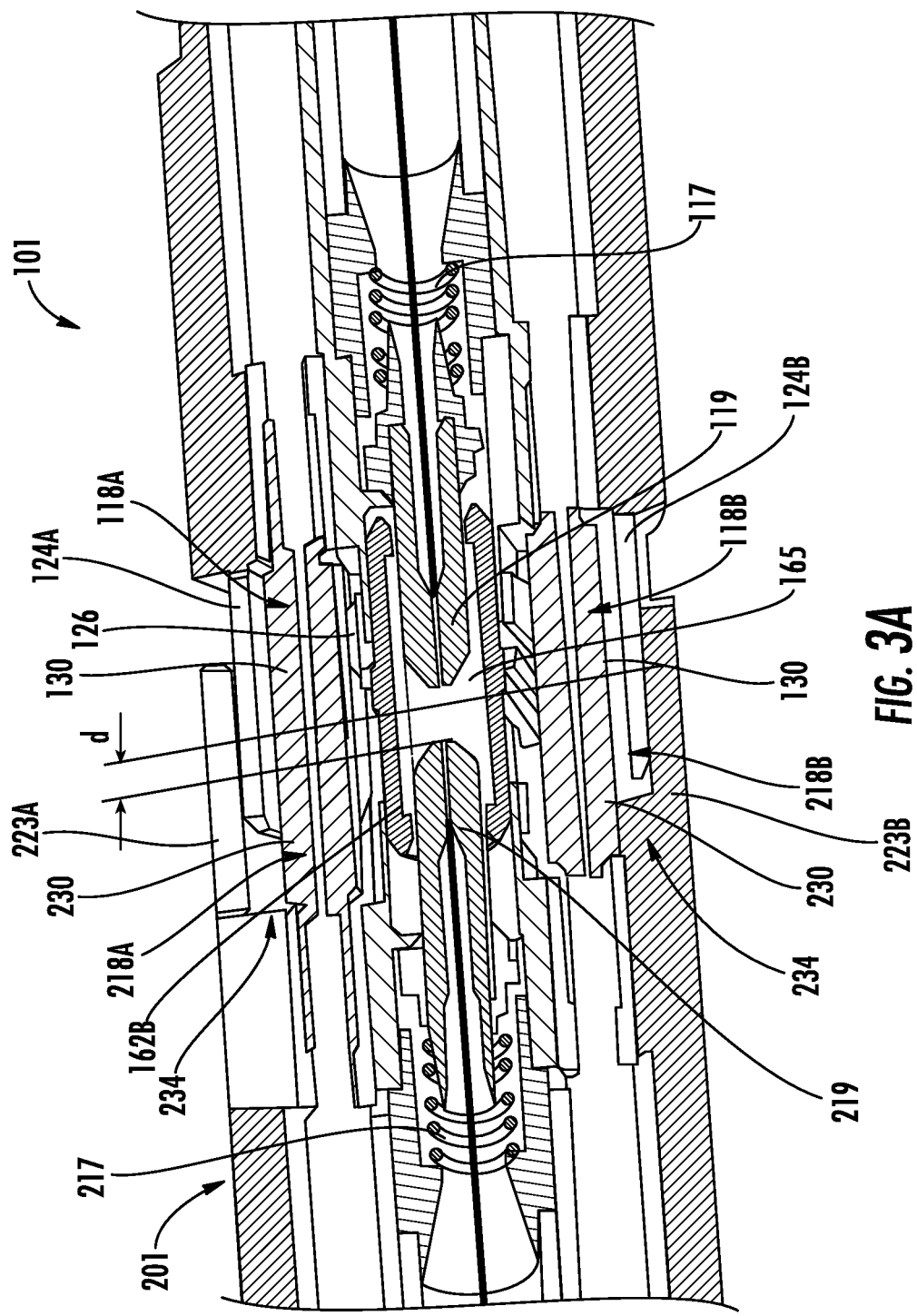
FIG. 3A schematically depicts a close-up, cutaway view of a first hybrid optical connector and a second hybrid optical connector in a partially mated state according to one or more embodiments and illustrated herein.
Figure 3B:
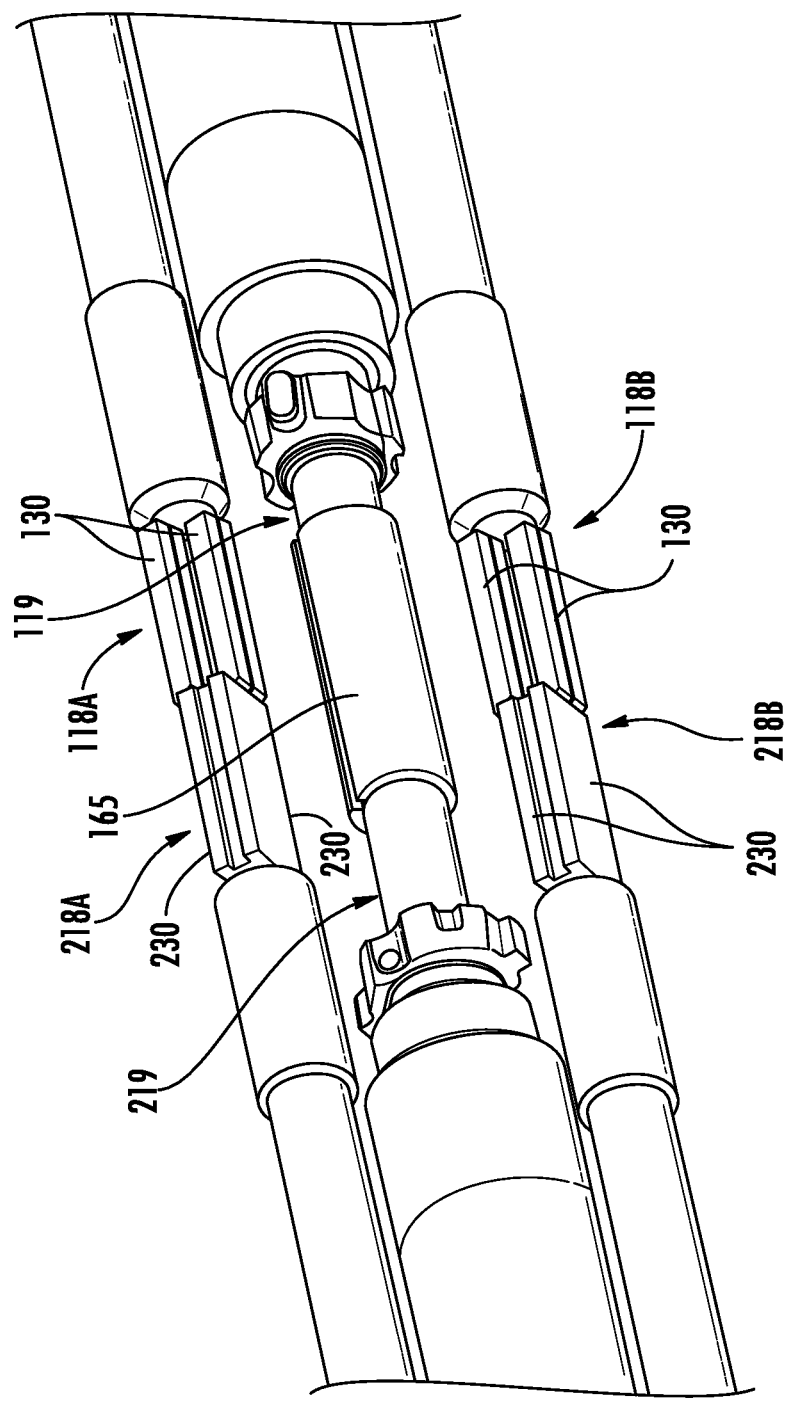
FIG. 3B schematically depicts a close-up view of the first hybrid optical connector and the second hybrid optical connector of FIG. 3A in a partially mated state with the connector housing removed according to one or more embodiments and illustrated herein.

FIG. 3A schematically illustrates a cutaway view of a first hybrid optical connector 101 partially mated with a second hybrid optical connector 201. FIG. 3B schematically illustrates the partial connection of FIG. 3A with the first connector housing 120 and the second connector housing 220 removed to show the mating of the first hermaphroditic electrical contacts 118A, 218A and the second hermaphroditic electrical contacts 118B, 218B.

As the first hybrid optical connector 101 is brought into contact with the second hybrid optical connector 201, the ferrule 119 of the first hybrid optical connector 101 and the ferrule 219 of the second hybrid optical connector 201 are partially disposed within the ferrule sleeve 165 and the inner portion 162 of the adapter 160. The male second halves 124A, 124B of the first hybrid optical connector 101 are inserted into the openings 234 defined by the first halves 223A, 223B of the second hybrid optical connector 201. The second halves (not shown in FIGS. 3A-3C) of the second hybrid optical connector 201 are disposed in the openings of the first halves (not shown in FIGS. 3A-3C) of the first hybrid optical connector 101.

Additionally, the first and second hermaphroditic electrical contacts 118A, 118B of the first hybrid optical connector 101 contact the first and second hermaphroditic electrical contacts 218A, 218B of the second hybrid optical connector. The length of the first hermaphroditic electrical contacts 118A, 218A and the second hermaphroditic electrical contacts 118B, 218B is such that the tips of these hermaphroditic electrical contacts contact one another prior to contact between the tips of the ferrules 119, 219. As shown by FIG. 3A, an offset distance d is present between the tips of the first and second hermaphroditic electrical contacts 218A, 218B and the tip of the ferrule 219 of the second hybrid optical connector 201. The same is true for the first and second hermaphroditic electrical contacts 118A, 118B and the tip of the ferrule 119 of the first hybrid optical connector 101. The offset distance d allows for any electrical arcing that is produced between the mated hermaphroditic electrical contacts occurs at a distance away from the tips of the ferrules 119, 219, thereby preventing any damage to the tips of the ferrules 119, 219. This provides hot swappability for the first and second hybrid optical connectors 101, 201.

Referring to FIG. 3B, the first and second hermaphroditic electrical contacts 118A, 118B of the first hybrid optical connector 101 are rotated ninety degrees with respect to the first and second hermaphroditic electrical contacts 218A, 218B of the second hybrid optical connector 202. The round portions of the compliant members 130 of the first and second hermaphroditic electrical contacts 118A, 118B of the first hybrid optical connector 101 contact the round portions of the compliant members 230 of the first and second hermaphroditic electrical contacts 218A, 218B of the second hybrid optical connector 202. Upon mating between the first hybrid optical connector 101 and the second hybrid optical connector 201 the compliant members 130, 230 are deflected outward by contact with one another.

Figure 3C:
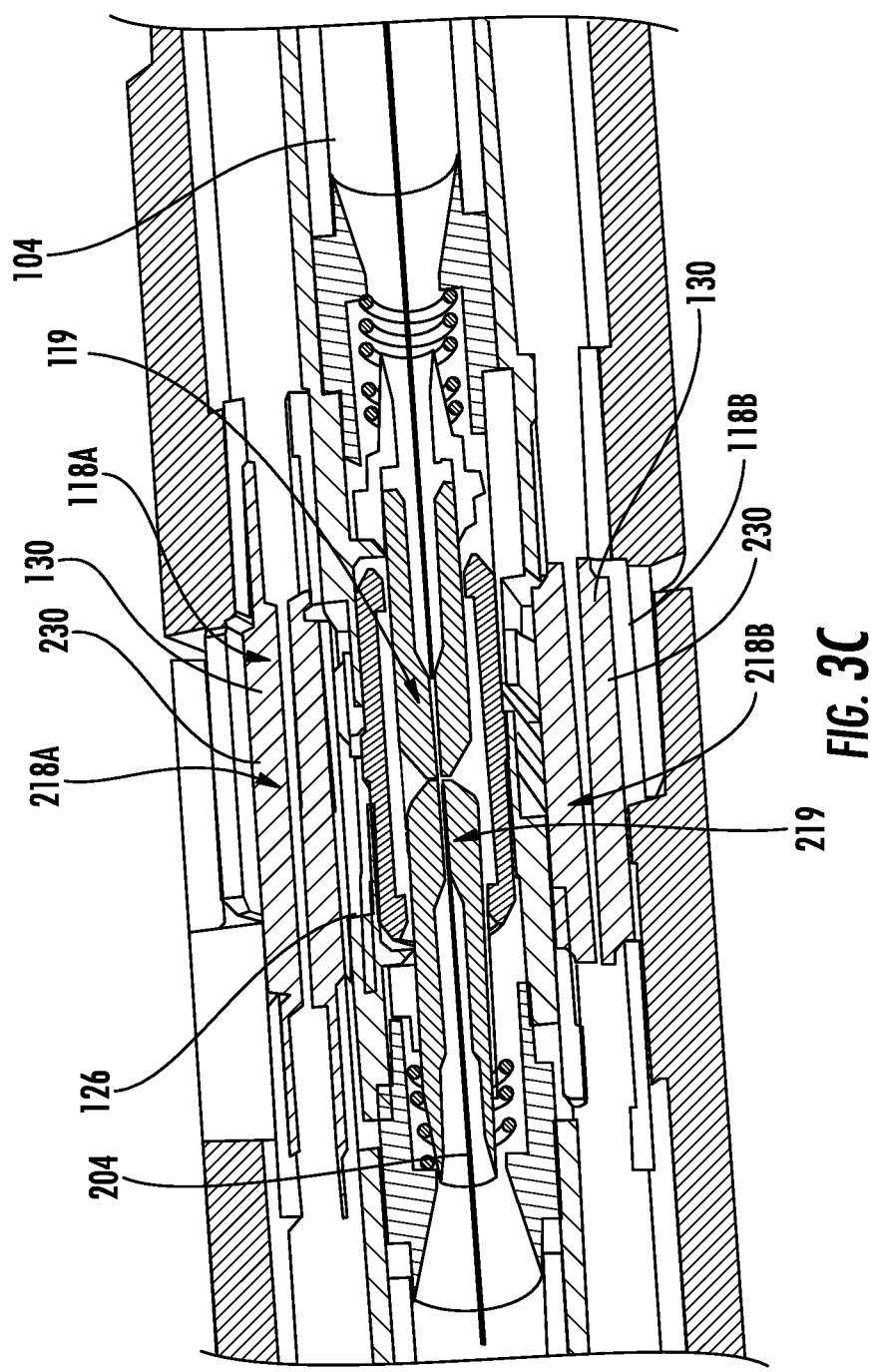
FIG. 3C schematically depicts a close-up, cutaway view of the first hybrid optical connector and the second hybrid optical connector of FIG. 3A in a mated state according to one or more embodiments and illustrated herein.

FIG. 3C schematically illustrates a cutaway view of the first hybrid optical connector 101 and the second hybrid optical connector 201 of FIG. 3A in a fully mated state. The compliant members 130, 230 partially overlap one another, and press into the surfaces of one another to create low resistance for electrical current flow. The four compliant members 130, 230 of each connector provide for four contact points. Thus, if one or more of the compliant members 130, 230 fail, there are still other contact points for reliable electrical current flow. The tips of the ferrules 119, 219 may contact one another to provide optical coupling between optical fibers 104, 204.

An advantage of the design of the hybrid optical connectors of the present disclosure is that an adapter is only used for the optical connector, and no adapter is used for the electrical connections. This leads to lower electrical resistance, and thus lower electrical loss, provided by the electrical connection compared to the case where an electrical adapter is employed.

In some embodiments, a hardened adapter may be used, particularly in outdoor applications, or in harsh environments where it is desirable to protect the hybrid optical connectors. FIG. 4 schematically illustrates the first hybrid optical connector 101 and the second hybrid optical connector 201 depicted by FIGS. 3A-3C and an example hardened adapter 300 operable to facilitate connection between the first hybrid optical connector 101 and the second hybrid optical connector 201. The example hardened adapter 300 includes a first receiving portion 302A operable to receive the first hybrid optical connector 101 and a second receiving portion 302B operable to receive the second hybrid optical connector 201. The first and second receiving portions 302A, 302B are sized to securely receive the first and second hybrid optical connectors 101, 201, respectively. As an example and not a limitation, the first and second hybrid optical connectors 101, 201 are maintained within the first and second receiving portions 302A, 302B by an interference fit. Alternatively, one or more engagement features (not shown) may be utilized to releasably engage the first and second hybrid optical connectors 101, 201 within the hardened adapter 300. In the illustrated embodiment, the O-ring 106, 206 provides a seal between the first and second hybrid optical connectors 101, 201 and the first and second receiving portions 302A, 302B of the hardened adapter 300, respectively.

FIG. 5 schematically illustrates a ganged hardened adapter 400 comprising a plurality of first receiving portions 402A and a plurality of second receiving portions 402B. FIG. 4 illustrates one first hybrid optical connector 101 to be disposed within one of the first receiving portions 402A and one second hybrid optical connector 202 to be disposed within one of the second receiving portions 402B.

It is noted that, in some embodiments, the hardened adapter 300 of FIG. 4 and the ganged hardened adapter 400 of FIG. 5 may be configured to feed power to the connected hybrid optical cables. For example, adapter hermaphroditic electrical contacts (not shown) may be provided within the hardened adapter 300 and the ganged hardened adapter 400 for mating with the hermaphroditic electrical contacts of the first and second hybrid optical connectors 101, 201. A power connection 303 as shown in FIG. 4 may be provided to plug into a power source, such as an electrical outlet. The power connection 303 may take on any configuration and is not limited to the power connection 303 shown in FIG. 4.

Figure 6:
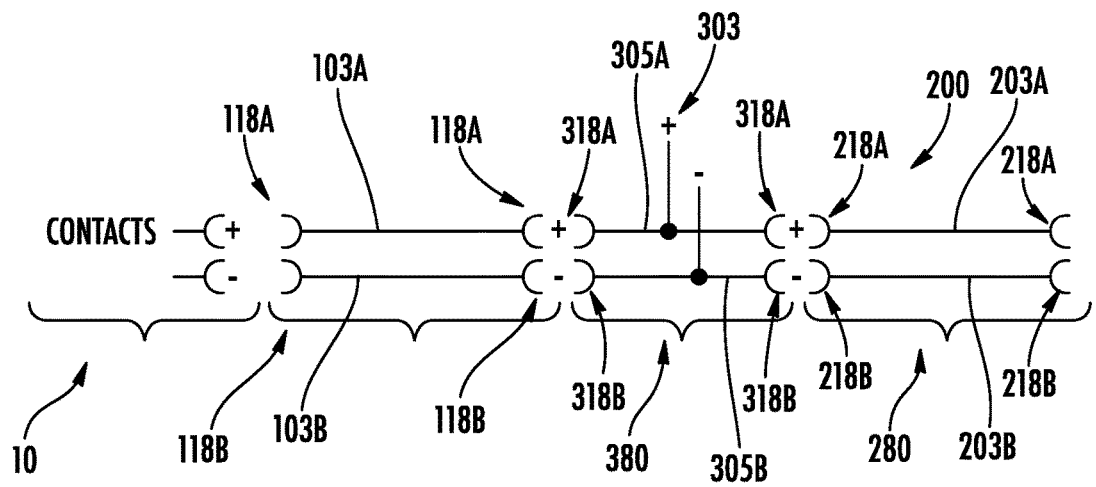
FIG. 6 schematically depicts electrical connections between a device, a first hybrid optical cable, an adapter, and a second hybrid optical cable according to one or more embodiments and illustrated herein.

FIG. 6 schematically illustrates electrical connections between a device 10, a first hybrid optical cable assembly 100, an hardened adapter 300, and a second hybrid optical cable 200. The device 10 has positive (+) and negative (−) electrical contacts. The first hybrid optical cable assembly 100 has first hermaphroditic electrical contacts 118A at opposite ends of a first electrical conductor 103A and second hermaphroditic electrical contacts 118B at opposite ends of a second electrical conductor 103B.

The hardened adapter 300 has first hermaphroditic electrical contacts 318A at opposite ends of a first electrical conductor 305A and second hermaphroditic electrical contacts 318B at opposite ends of a second electrical conductor 305B. In some embodiments, there are no separate electrical conductors between the sets of first and second hermaphroditic electrical contacts 318A, 318B. In some embodiments, a power connection 303 is provided to the first electrical conductor 305A and the second electrical conductor 305B to externally provide electrical power to the coupled components. It should be understood that other embodiments do not utilize a power connection 303.

The second hybrid optical cable 200 has first hermaphroditic electrical contacts 218A at opposite ends of a first electrical conductor 203A, and second hermaphroditic electrical contacts 218B at opposite ends of a second electrical conductor 203B.

Figure 7:
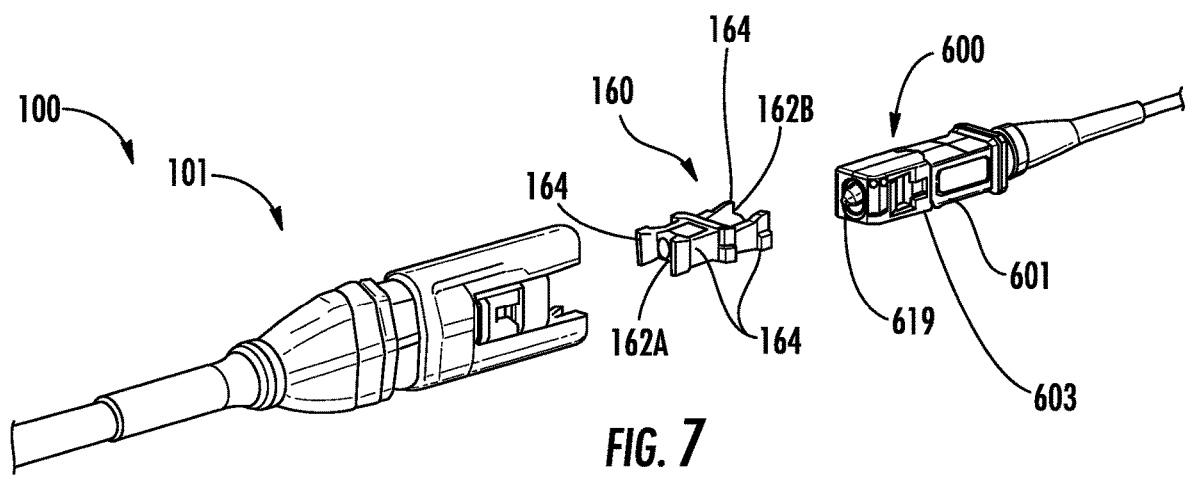
FIG. 7 schematically depicts a perspective view of a first hybrid optical connector, an adapter, and an SC optical connector in an unmated state according to one or more embodiments and illustrated herein.

FIG. 7 schematically illustrates the hybrid optical connector 101 and adapter 160 of FIG. 2 for mating with an SC connector 600. Particularly, the arms 164 interface with engagement features 603 of the body 601 of the SC connector 600.

However, in some cases the SC connector 600 may be coupled to the hybrid optical connector 101 in only one proper orientation. As an example, the tip of the ferrules 119, 619 may be angled (e.g., an APC ferrule), and therefore the ferrules 119, 619 may only be mated in one orientation. If the ferrule end faces are 180° with respect to one another, the ferrule end faces of the ferrules 119, 619 will not match each other. Therefore, keying may be required to ensure that the SC connector 600 is connected to the hybrid optical connector 101 in the proper orientation. It should be understood that embodiments are not limited to SC connectors, and other single-fiber connector types are also compatible with the hybrid optical connectors described herein.

Figure 8A:
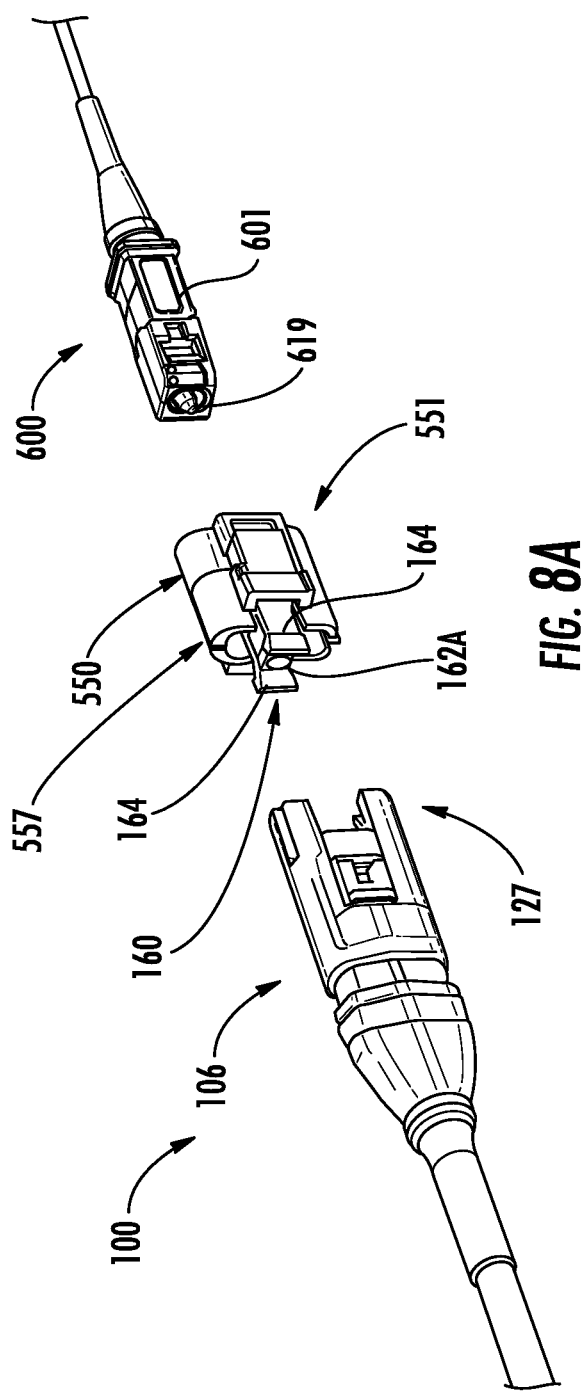
FIG. 8A schematically depicts a perspective view of a first hybrid optical connector, a hybrid optical connector adapter assembly, and an SC optical connector in an unmated state according to one or more embodiments and illustrated herein.
Figure 8B:
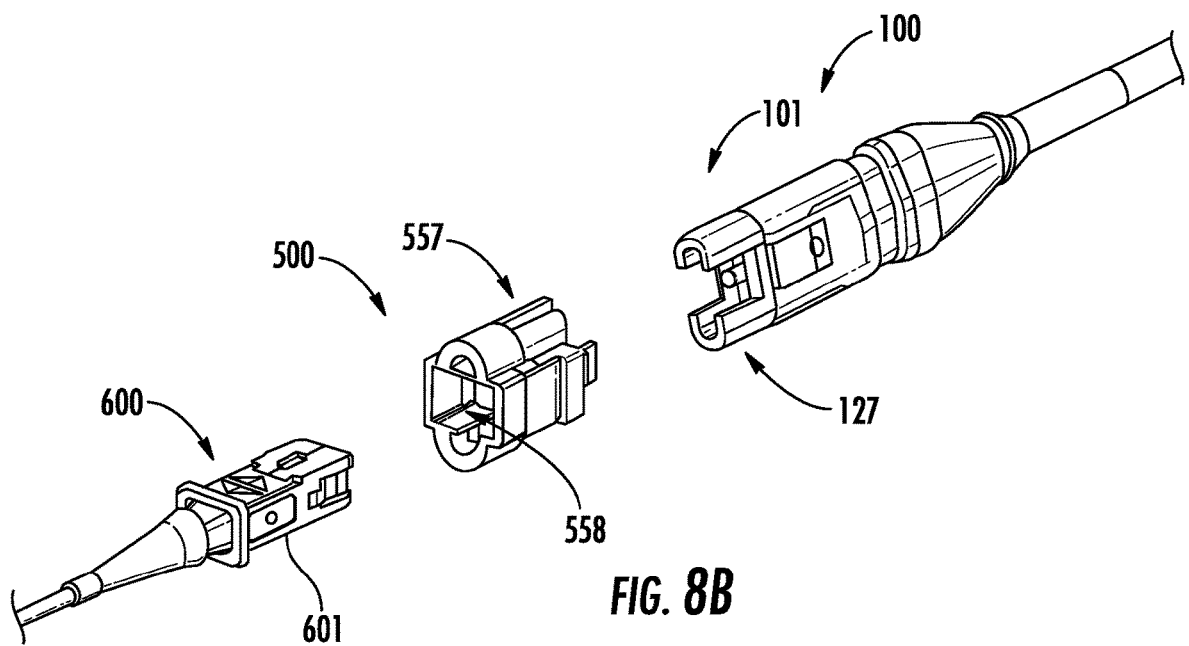
FIG. 8B schematically depicts another perspective view of the first hybrid optical connector, the hybrid optical connector adapter assembly, and the SC optical connector of FIG. 8A in an unmated state according to one or more embodiments and illustrated herein.
Figure 8C:
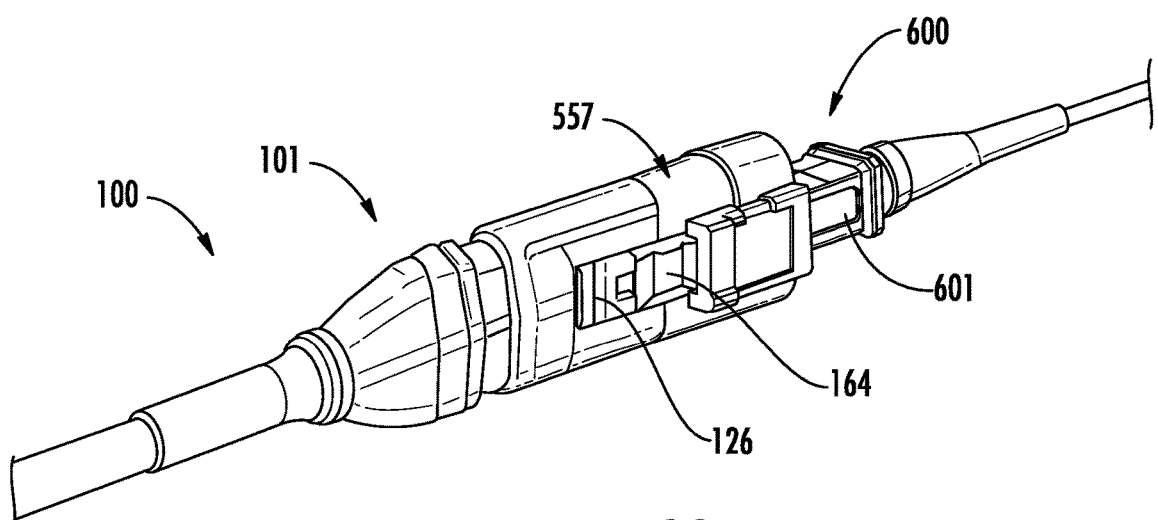
FIG. 8C schematically depicts a perspective view of the first hybrid optical connector, the hybrid optical connector adapter assembly, and the SC optical connector of FIG. 8A in a mated state according to one or more embodiments and illustrated herein.

FIGS. 8A-8C schematically illustrate the first hybrid optical connector 101 and the SC connector of FIG. 7, along with an adapter 160 disposed within an adapter housing 550. FIGS. 8A and 8B illustrate two opposing perspective views of the first hybrid optical connector 101 the adapter 160, the adapter housing 550, and the SC connector 600 in an unmated state. FIG. 8C schematically illustrates a perspective view of the first hybrid optical connector 101, the adapter 160, the adapter housing 550, and the SC connector 600 in a mated state. The adapter 160 and the adapter housing 550 define a hybrid optical connector adapter assembly 551 that enables a first connector type to be optically coupled to a second connector type.

The adapter housing 550 is configured to receive the adapter 160. As shown in FIG. 8B, the adapter housing 550 has an opening 558 sized and configured to receive the body 601 of the SC connector 600. The opening 558 may include keying features operable to mate with the body 601 such that the SC connector 600 may only be inserted into the opening 558 in only one orientation.

The adapter housing 550 further includes an insertion portion 557 configured as an insertion portion 127 described above with respect to the first hybrid optical connector 101. Thus, the insertion portion 557 of the adapter housing 550 is operable to be mated with the insertion portion 127 of the first hybrid optical connector 101 in a manner as described above with respect to the first and second hybrid optical connectors 101, 201. Thus, the insertion portion 557 of the adapter housing 550 may be mated with the insertion portion 127 of the first hybrid optical connector 101 in only one orientation. Accordingly, the adapter housing 550 allows ferrules of optical connectors having angled ferrule end faces to be properly mated in a single orientation.

Referring now to FIG. 9, another example embodiment of a hybrid optical connector 501 is schematically illustrated. The example hybrid optical connector 501 of FIG. 9 has an insertion portion 527 having a configuration that is different from the insertion portion 127 described above and illustrated in FIGS. 1A-1G. However, the insertion portion 527 of FIG. 9 is also asymmetric for keying functionality.

The insertion portion 527 has a first portion 525A and a second portion 525B. The first portion 525A of the insertion portion 527 comprises a first half 523A and a second half 524A. The first half 523A comprises a long outer portion 540 and a short inner portion 541, each configured as quarter circles. The long outer portion 540 is longer than the short inner portion 541 and thus extends beyond the short inner portion 541 in an insertion direction of the hybrid optical connector 501 (i.e., the z-axis). The second half 524A comprises a long inner portion 543 and a short outer portion 542, each configured as quarter circles. The long inner portion 543 extends beyond the short outer portion 542 in an insertion direction of the hybrid optical connector 501. Thus, the long and short portions of the first half 523A and the second half 524A are opposite from one another.

Similarly, the second portion 525B of the insertion portion 527 comprises a first half 523B and a second half 524B. The first half 523B comprises a long outer portion 540 and a short inner portion 541, each configured as quarter circles. The long outer portion 540 is longer than the short inner portion 541 and thus extends beyond the short inner portion 541 in an insertion direction of the hybrid optical connector 501 (i.e., the z-axis). The second half 524B comprises a long inner portion 543 and a short outer portion 542, each configured as quarter circles. The long inner portion 543 extends beyond the short outer portion 542 in an insertion direction of the hybrid optical connector 501. Thus, the long and short portions of the first half 523B and the second half 524B are opposite from one another.

Thus, the insertion portion 527 is asymmetric with respect to a mid-plane MP. This asymmetry provides keying to allow only one insertion orientation upon mating between hybrid optical connectors, and thus to maintain positive and negative connection requirements.

Figure 10:
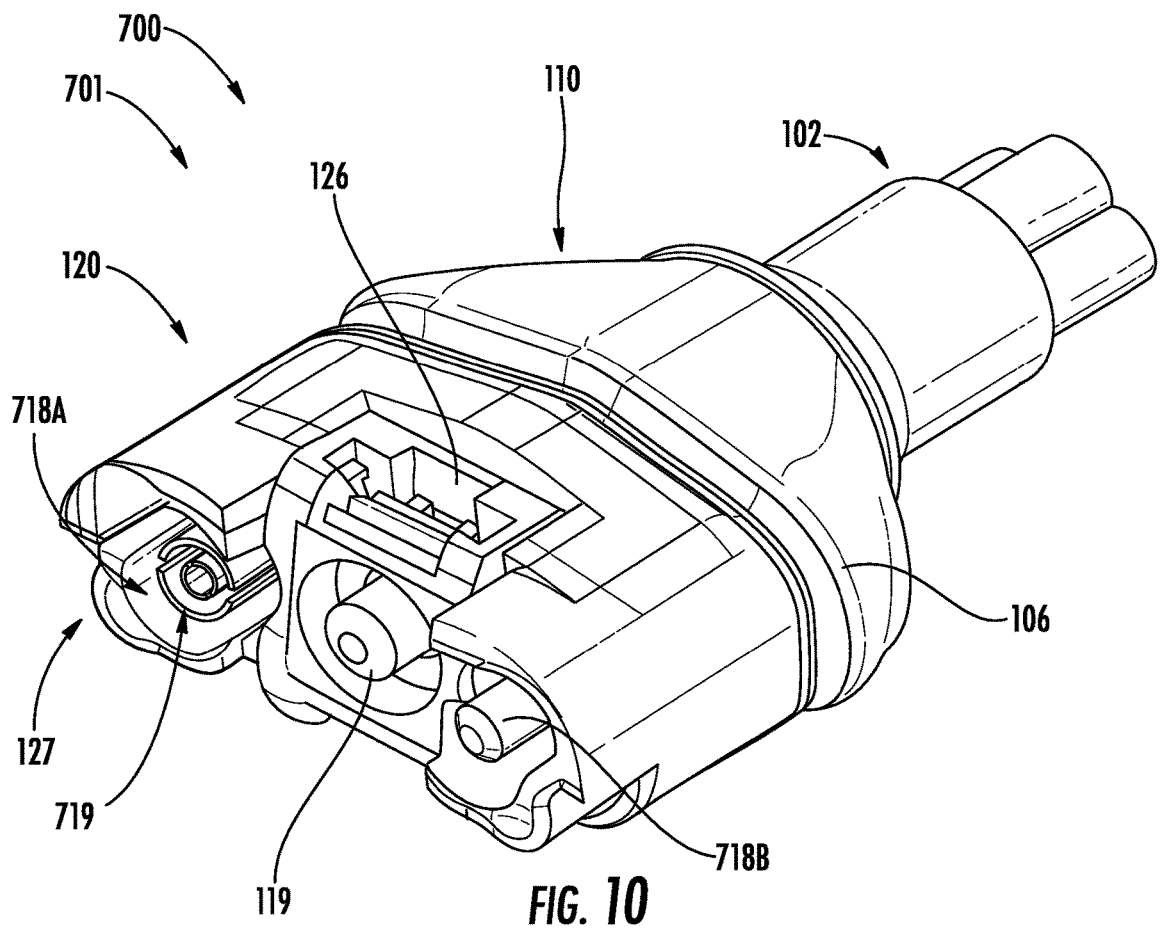
FIG. 10 schematically depicts a perspective view of another hybrid optical connector having a male electrical contact and a female electrical contact according to one or more embodiments and illustrated herein.

FIG. 10 schematically illustrates another example hybrid optical cable 700 with an hybrid optical connector 701 similar in configuration to the hybrid optical connector 101 depicted in FIGS. 1A-1G except that the electrical conductors are configured as a female electrical contact 718A and a male electrical contact 718B rather than hermaphroditic electrical conductors as described above. The male electrical contact 718B is configured as a male pin. The female electrical contact 718A includes a bore 719 that is sized to receive a male electrical contact 718B of a mated hybrid optical connector.

Figure 11:
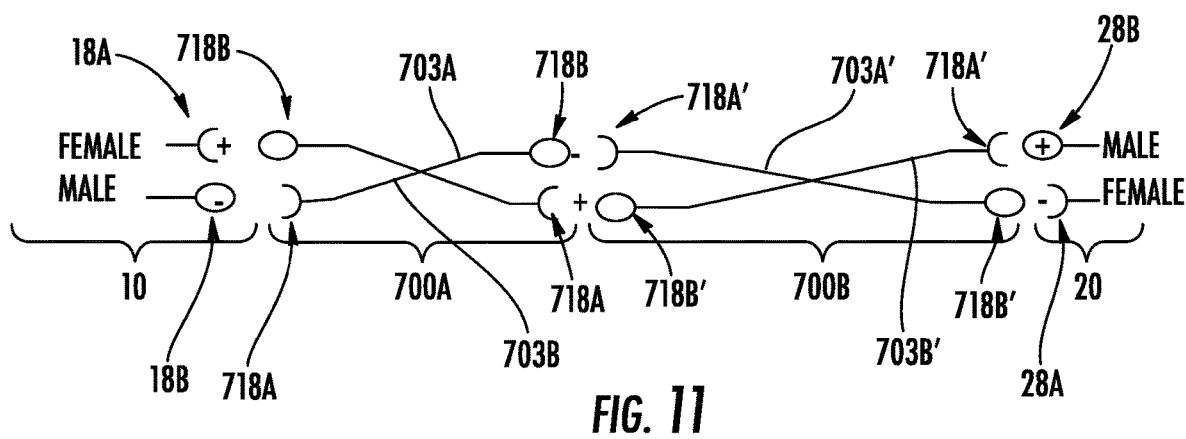
FIG. 11 schematically depicts electrical connectors between a first device, a first hybrid optical cable of FIG. 10, an adapter, a second hybrid optical cable of FIG. 10, and a second device according to one or more embodiments and illustrated herein.

To prevent reverse polarity in the hybrid optical cable 700 depicted by FIG. 10, the electrical conductors within the hybrid optical cable 700 may be crossed. FIG. 11 schematically depicts electrical connectors of first device 10, a first hybrid optical cable 700A, a second hybrid optical cable 700B, and a second device 20. The polarity of the electrical connections is determined by the powering device (e.g., second device 20). The first device 10 has a female electrical contact 18A electrically coupled to a male electrical contact 718B and a male electrical contact 18B electrically coupled to a female electrical contact 718A. First and second electrical conductors 703A, 703B within the first hybrid optical cable 700A are crossed such that the first electrical conductor 703A is electrically coupled to a female electrical contact 718A at a first end and a male electrical contact 718B at a second end, and the second electrical conductor 703B is electrically coupled to a male electrical contact 718B at a first end and a female electrical contact 718A at a second end.

A female electrical contact 718A' of the second hybrid optical cable 700B is electrically coupled to a male electrical contact 718B of the first hybrid optical cable 700A, and a male electrical contact 718B' of the second hybrid optical cable 700B is electrically coupled to a female electrical contact 718A of the first hybrid optical cable 700A. First and second electrical conductors 703A', 703B' within the second hybrid optical cable 700B are crossed such that the first electrical conductor 703A' is electrically coupled to a female electrical contact 718A' at a first end and a male electrical contact 718B' at a second end, and the second electrical conductor 703B' is electrically coupled to a male electrical contact 718B' at a first end and a female electrical contact 718A' at a second end.

A male electrical contact 28B of the second device 20 is electrically coupled to a female electrical contact 718A' of the second hybrid optical cable 700B and a female electrical contact 28A of the second device 20 is electrically coupled to a male electrical contact 718B' of the second hybrid optical cable 700B. As shown in FIG. 11, proper electrical polarity is maintained between the first device 10 and the second device 20.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A hybrid optical connector comprising:
    a connector housing comprising an insertion portion, wherein:
        the insertion portion comprises a first portion and a second portion;
        the first portion and the second portion each comprise a first half and a second half;
        the first halves define a female coupling feature having an opening;
        the second halves define a male coupling feature;
        a width of the first half of the first and second portions is greater than a width of the second half of the first and second portions; and
        the insertion portion is asymmetric with respect to a mid-plane of the connector housing that is positioned in an optical axis of the hybrid optical connector;
    a ferrule disposed within the connector housing, wherein the ferrule is at least partially disposed within an opening between the first portion and the second portion; and
    a first hermaphroditic electrical contact and a second hermaphroditic electrical contact disposed within the connector housing adjacent opposing sides of the ferrule.

2. The hybrid optical connector of claim 1, wherein the insertion portion extends beyond a tip of the first hermaphroditic electrical contact and the second hermaphroditic electrical contact.

3. The hybrid optical connector of claim 1, wherein:
    each second half of the first and second portions comprises a lobe feature; and
    each first half of the first and second portions comprises a scalloped wall operable to receive a lobe feature of a mated hybrid optical connector.

4. The hybrid optical connector of claim 1, wherein:
    the first portion and the second portion each comprise a first half and a second half;
    each first half of the first and second portions comprises a long outer portion and a short inner portion such that a length of the long outer portion is greater than a length of the short inner portion; and
    each second half of the first and second portions comprises a long inner portion and a short outer portion such that a length of the long inner portion is greater than a length of the short outer portion.

5. The hybrid optical connector of claim 1, wherein a distance between the first hermaphroditic electrical contact and the second hermaphroditic electrical contact along the mid-plane is 10 mm or more.

6. The hybrid optical connector of claim 1, wherein the first hermaphroditic electrical contact and the second hermaphroditic electrical contact extend beyond a tip of the ferrule along an insertion direction of the hybrid optical connector.

7. The hybrid optical connector of claim 1, wherein the connector housing defines a ferrule housing, and the ferrule is disposed within the ferrule housing.

8. The hybrid optical connector of claim 7, further comprising a slider cap disposed on the ferrule housing.

9. The hybrid optical connector of claim 1, Wherein each of the first hermaphroditic electrical contact and the second hermaphroditic electrical contact comprises a first compliant member and a second compliant member.

10. The hybrid optical connector of claim 9, wherein the first compliant member is adjacent the second compliant member, and the first compliant member and the second compliant member are operable to be deflected away from one another when mated with mated hermaphroditic electrical contacts of a mated hybrid optical connector.

11. The hybrid optical connector of claim 10, wherein:
    the first compliant member and the second compliant member have a D-shape in cross-section;
    a round portion of the first compliant member faces a round portion of the second compliant member; and a contact plane orthogonal to a flat portion of the first compliant member and the second compliant member is transverse to an insertion plane that is orthogonal to the mid-plane and is positioned on the optical axis of the hybrid optical connector.

12. The hybrid optical connector of claim 1, wherein the connector housing is made from polyetherimide.

13. A hybrid optical cable comprising: a cable assembly comprising:
   an optical fiber;
   a first electrical conductor and a second electrical conductor; and
   a hybrid optical connector comprising:
      a connector housing comprising an insertion portion, wherein:
         the insertion portion comprises a first portion and a second portion;
         the first portion and the second portion each comprise a first half and a second half;
         the first halves define a female coupling feature having an opening; the second halves define a male coupling feature;
         a width of the first half of the first and second portions is greater than a width of the second half of the first and second portions; and
         the insertion portion is asymmetric with respect to a mid-plane of the connector housing that is positioned in an optical axis of the hybrid optical connector;
      a ferrule disposed within the connector housing, wherein the optical fiber is disposed within the ferrule and the ferrule is at least partially disposed within an opening between the first portion and the second portion; and
      a first hermaphroditic electrical contact and a second hermaphroditic electrical contact disposed within the connector housing adjacent opposing sides of the ferrule, wherein the first electrical conductor is electrically coupled to the first hermaphroditic electrical contact and the second electrical conductor is electrically coupled to the second hermaphroditic electrical contact.

14. The hybrid optical cable of claim 13, wherein the insertion portion extends beyond a tip of the first hermaphroditic electrical contact and the second hermaphroditic electrical contact.

15. The hybrid optical cable of claim 13, wherein:
   each second half of the first and second portions comprises a lobe feature; and
   each first half of the first and second portions comprises a scalloped wall operable to receive a lobe feature of a mated hybrid optical connector.

16. The hybrid optical cable of claim 13, wherein:
   the first portion and the second portion each comprise a first half and a second half;
   each first half of the first and second portions comprises a long outer portion and a short inner portion such that a length of the long outer portion is greater than a length of the short inner portion; and
   each second half of the first and second portions comprises a long inner portion and a short outer portion such that a length of the long inner portion is greater than a length of the short outer portion.

17. The hybrid optical cable of claim 13, wherein a distance between the first hermaphroditic electrical contact and the second hermaphroditic electrical contact along the mid-plane is 10 mm or more.

18. The hybrid optical cable of claim 13, wherein the connector housing is made from polyetherimide.

19. The hybrid optical cable of claim 13, wherein the first hermaphroditic electrical contact and the second hermaphroditic electrical contact extend beyond a tip of the ferrule along an insertion direction of the hybrid optical connector.

20. The hybrid optical cable of claim 13, wherein the connector housing defines a ferrule housing, and the ferrule is disposed within the ferrule housing.

21. The hybrid optical cable of claim 20, further comprising a slider cap disposed on the ferrule housing.

22. The hybrid optical cable of claim 11, wherein each of the first hermaphroditic electrical contact and the second hermaphroditic electrical contact comprises a first compliant member and a second compliant member.

23. The hybrid optical cable of claim 22, wherein the first compliant member is adjacent the second compliant member, and the first compliant member and the second compliant member are operable to be deflected away from one another when mated with mated hermaphroditic electrical contacts of a mated hybrid optical connector.

24. The hybrid optical cable of claim 23, wherein:
   the first compliant member and the second compliant member have a D-shape in cross-section;
   a round portion of the first compliant member faces a round portion of the second compliant member; and
   a contact plane orthogonal to a flat portion of the first compliant member and the second compliant member is transverse to an insertion plane that is orthogonal to the mid-plane and is positioned on the optical axis of the hybrid optical connector.

25. A hybrid optical connector comprising:
   a connector housing comprising an insertion portion, wherein:
      the insertion portion comprises a first portion and a second portion;
      the first portion and the second portion each comprise a first half and a second half;
      the first halves define a female coupling feature having an opening; the second halves define a male coupling feature;
      a width of the first half of the first and second portions is greater than a width of the second half of the first and second portion; and
      the insertion portion is asymmetric with respect to a mid-plane of the connector housing that is positioned in an optical axis of the hybrid optical connector;
   a ferrule disposed within the connector housing, the ferrule is at least partially disposed within an opening between the first portion and the second portion; and
   an hermaphroditic male electrical contact and an hermaphroditic female electrical contact disposed within the connector housing adjacent opposing sides of the ferrule, wherein the female electrical contact defines a bore.

26. The hybrid optical connector of claim 25, wherein the insertion portion extends beyond a tip of the male electrical contact and the female electrical contact.

27. The hybrid optical connector of claim 25, wherein:
   each second half of the first and second portions comprises a lobe feature; and
   each first half of the first and second portions comprises a scalloped wall operable to receive a lobe feature of a mated hybrid optical connector.

28. The hybrid optical connector of claim 25, wherein:
   the first portion and the second portion each comprise a first half and a second half;

each first half of the first and second portions comprises a long outer portion and a short inner portion such that a length of the long outer portion is greater than a length of the short inner portion; and each second half of the first and second portions comprises a long inner portion and a short outer portion such that a length of the long inner portion is greater than a length of the short outer portion.

29. The hybrid optical connector of claim 25, Wherein a distance between the hermaphroditic male electrical contact and the hermaphroditic female electrical contact along the mid-plane is 10 mm or more.

30. The hybrid optical connector of claim 25, wherein the hermaphroditic male electrical contact and the hermaphroditic female electrical contact extend beyond a tip of the ferrule along an insertion direction of the hybrid optical connector.

31. The hybrid optical connector of claim 25, wherein the connector housing defines a ferrule housing, and the ferrule is disposed within the ferrule housing.

32. The hybrid optical connector of claim 31, further comprising a slider cap disposed on the ferrule housing.

\* \* \* \* \*

UNITED STATES PATENT AND TRADEMARK OFFICE
CERTIFICATE OF CORRECTION

PATENT NO. : 11,385,427 B2
APPLICATION NO. : 17/037987
DATED : July 12, 2022
INVENTOR(S) : Michael Wimmer It is certified that error appears in the above-identified patent and that said Letters Patent is hereby corrected as shown below:

On the Title Page

On the page 2, in Column 2, under "Other Publications", Line 4, delete "Fisher Bybrid," and insert -- Fischer Hybrid, --.

On the page 2, in Column 2, under "Other Publications", Line 6, delete "Retrived" and insert -- Retrieved --.

On the page 2, in Column 2, under "Other Publications", Line 27, delete "produc/" and insert -- product/ --.

On the page 2, in Column 2, under "Other Publications", Line 32, delete "Retrived" and insert -- Retrieved --.

On the page 2, in Column 2, under "Other Publications", Line 38, delete "Commector," and insert -- Connector, --.

On the page 2, in Column 2, under "Other Publications", Line 44, delete "retreieved" and insert -- retrieved --.

On the page 2, in Column 2, under "Other Publications", Line 46, delete "Datatsheet" and insert -- Datasheet --.

On the page 2, in Column 2, under "Other Publications", Line 50, delete "Availabe" and insert -- Available --.

In the Claims

In Column 14, Line 53, in Claim 9, delete "Wherein" and insert -- wherein --.

Signed and Sealed this
Eleventh Day of October, 2022

Katherine Kelly Vidal
*Director of the United States Patent and Trademark Office*

In Column 16, Line 12, in Claim 22, delete "claim 11," and insert -- claim 13, --.

In Column 17, Line 9, in Claim 29, delete "Wherein" and insert -- wherein --.